United States Patent
Hartel et al.

(10) Patent No.: US 12,080,975 B2
(45) Date of Patent: Sep. 3, 2024

(54) MULTI-DIAMETER POWER PIN AND RECEIVING SOCKET

(71) Applicant: TBI Industries GmbH, Fernwald (DE)

(72) Inventors: Marc A. Hartel, Reiskirchen (DE); Alexander Fischer, Gothenburg (SE); Carl-Johan Langeström, Gothenburg (SE); Dimitri Malyi, Gießen (DE); Stefan Süss, Nieder-Wiesen (DE)

(73) Assignee: TBI INDUSTRIES GMBH, Fernwald (DE)

( * ) Notice: Subject to any disclaimer, the term of this patent is extended or adjusted under 35 U.S.C. 154(b) by 793 days.

(21) Appl. No.: 17/215,436

(22) Filed: Mar. 29, 2021

(65) Prior Publication Data

US 2022/0311183 A1 Sep. 29, 2022

(51) Int. Cl.
*H01R 13/627* (2006.01)
*B23K 9/32* (2006.01)
*H01R 13/53* (2006.01)

(52) U.S. Cl.
CPC ........... *H01R 13/6276* (2013.01); *B23K 9/32* (2013.01); *H01R 13/53* (2013.01)

(58) Field of Classification Search
CPC .... H01R 13/6276; H01R 13/53; H01R 11/09; H01R 13/639; H01R 13/40; H01R 13/5205; H01R 13/6215; H01R 13/629; B23K 9/32; B23K 9/323; B23K 9/10; B23K 9/133
See application file for complete search history.

(56) References Cited

U.S. PATENT DOCUMENTS

| | | | |
|---|---|---|---|
| 3,358,267 A | 12/1967 | Henderson | |
| 3,544,758 A | 12/1970 | dal Molin | |
| 5,080,593 A | 1/1992 | Neumann et al. | |
| 5,902,150 A | 5/1999 | Sigl et al. | |
| 6,706,994 B1 * | 3/2004 | Sloan | B23K 9/323 219/121.48 |
| 7,682,208 B2 | 3/2010 | Bankstahl | |
| 8,444,325 B2 | 5/2013 | Guest | |
| 8,766,134 B2 | 7/2014 | Mather et al. | |
| 9,742,140 B2 | 8/2017 | Crowe | |
| 10,024,473 B2 | 7/2018 | Bruckner et al. | |

(Continued)

FOREIGN PATENT DOCUMENTS

| | | |
|---|---|---|
| DE | 8304593 U1 | 5/1983 |
| DE | 202012002162 U1 | 5/2012 |

*Primary Examiner* — Robert G Bachner
(74) *Attorney, Agent, or Firm* — Edell, Shapiro & Finnan, LLC

(57) ABSTRACT

An electrical connector is disclosed. The electrical connector includes a multi-diameter power pin having a proximal portion having a first diameter; an engagement portion having a second diameter smaller than the first diameter; a bearing portion having a third diameter smaller than the second diameter; and a threaded distal portion having a fourth diameter smaller than the third diameter. A receiving block having a multi-diameter through hole is configured to receive the multi-diameter power pin. The receiving block includes a plurality of gaps extending radially from the multi-diameter through hole to an outer surface of the receiving block, a receiving portion disposed between a lateral surface of the receiving block and a first gap of the plurality of gaps; and a clamping portion disposed between the plurality of gaps.

21 Claims, 15 Drawing Sheets

(56) References Cited

U.S. PATENT DOCUMENTS

| | | |
|---|---|---|
| 10,300,550 B2 | 5/2019 | Kinder et al. |
| 2006/0063396 A1* | 3/2006 | Bankstahl ............... H01R 4/56 439/11 |
| 2008/0032542 A1 | 2/2008 | Bankstahl |
| 2009/0047815 A1* | 2/2009 | Nicholson ........... H01R 13/533 29/592.1 |
| 2014/0131336 A1 | 5/2014 | Jacques |
| 2018/0133828 A1 | 5/2018 | Pike et al. |
| 2018/0290227 A1 | 10/2018 | Kachline et al. |

* cited by examiner

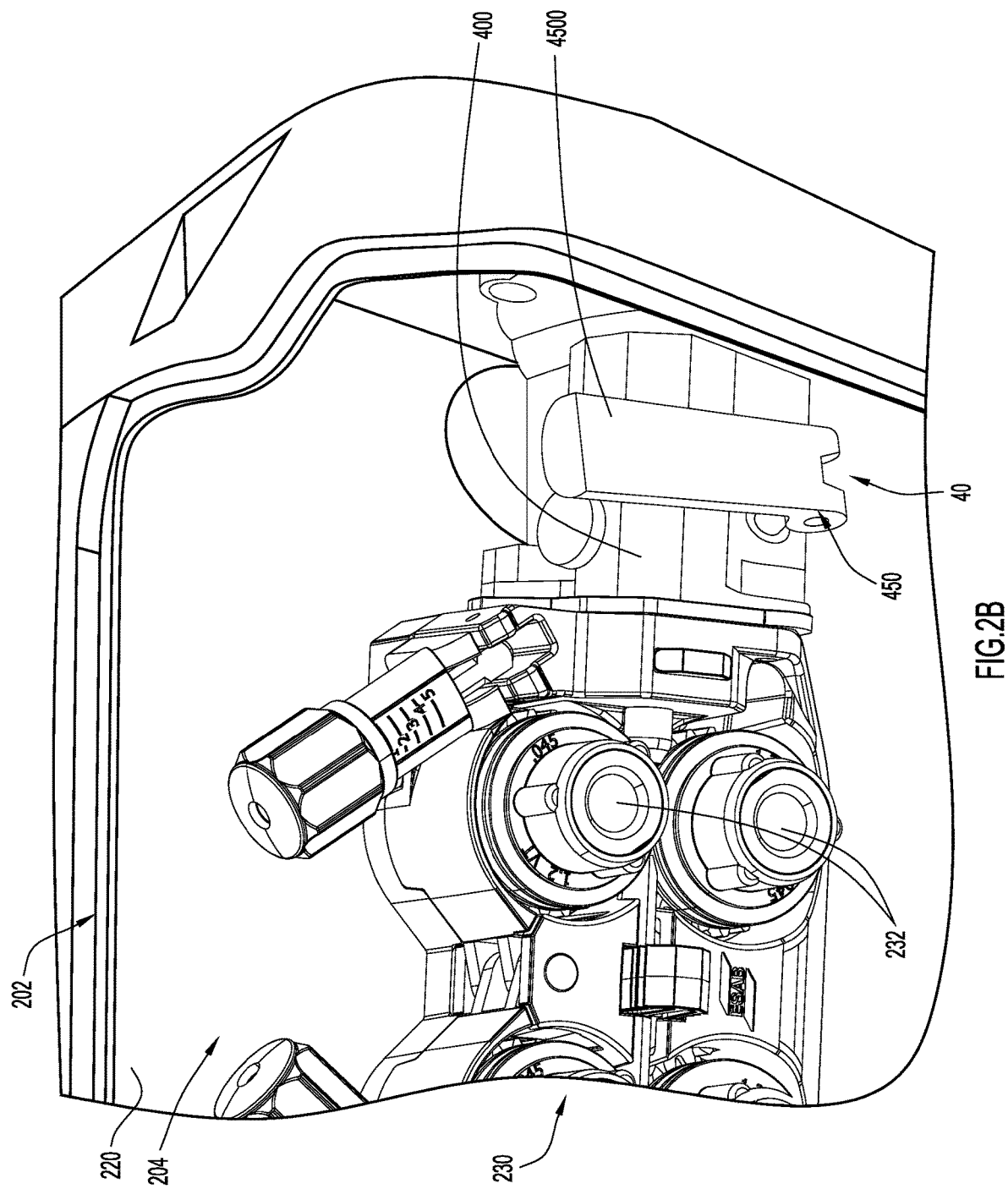

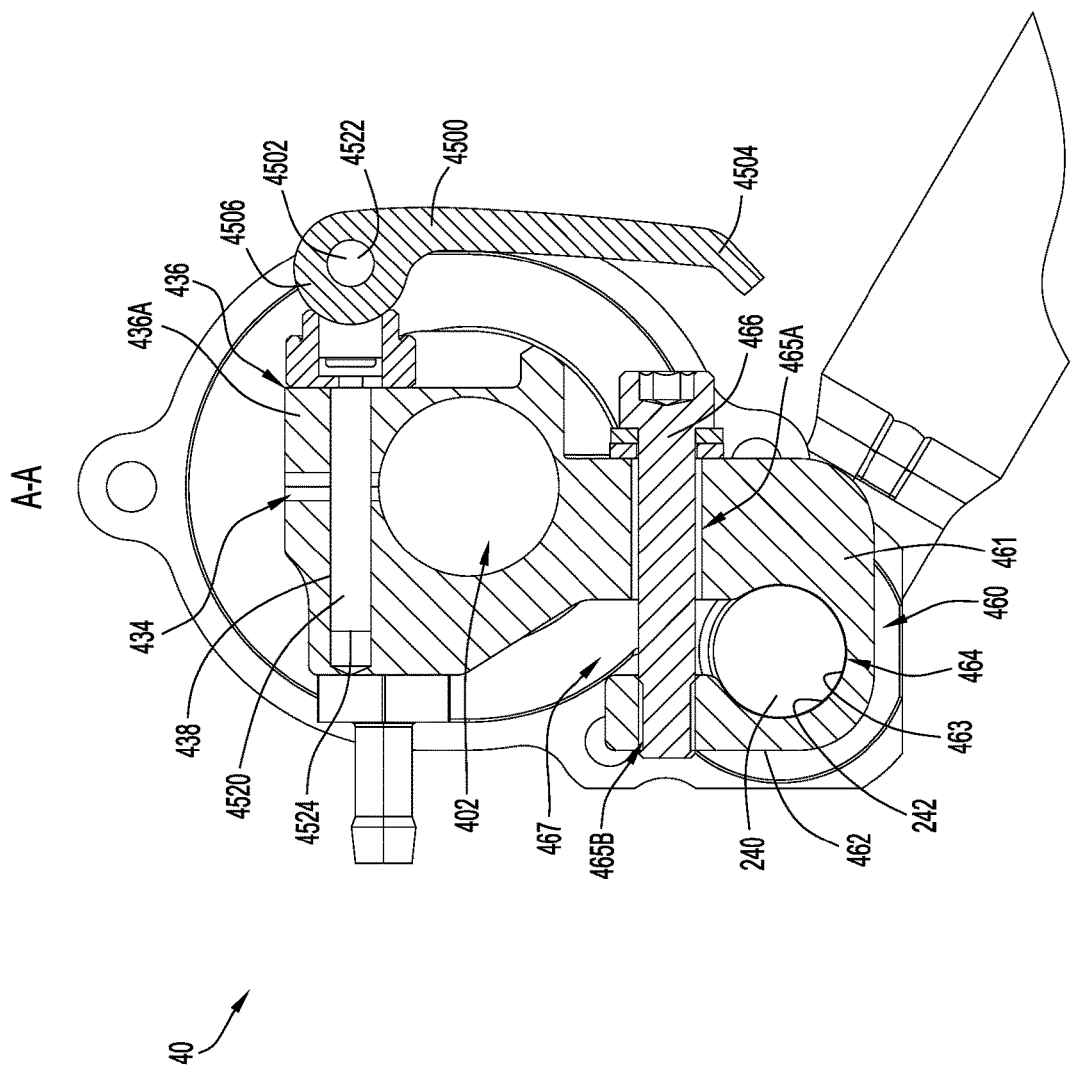

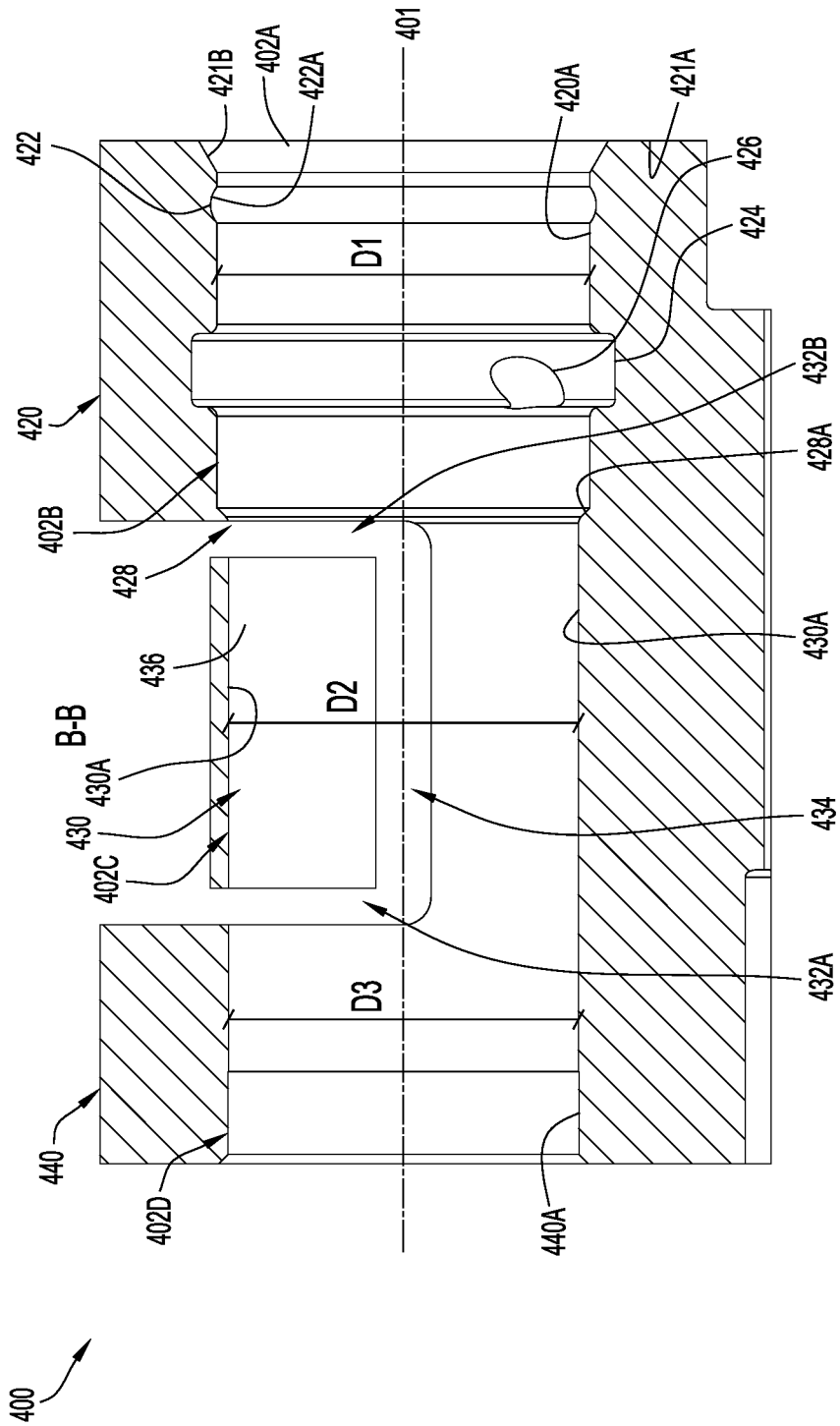

— 1 —

MULTI-DIAMETER POWER PIN AND RECEIVING SOCKET

FIELD OF INVENTION

The present invention relates to the field of electrical connections and, in particular, a connector with a multi-diameter power pin and receiving block for an arc process operation system.

BACKGROUND

Generally, welding robots include one or more arms, a torch, and a wire feeder for feeding weld wire to the torch. The torch is disposed at a distal end of the robot and the wire feeder is disposed between a base of the torch and the distal end. A cable connects the wire feeder to the torch and provides one or more of electricity, weld wire, process gas, and cooling fluid from the wire feeder. Close contact between a power pin of the plug and receiving block of a socket is desirable for proper transfer of electricity and fluids from the wire feeder to the torch cable.

Typically, a user climbs up the robot to connect the torch cable to the wire feeder. The user inserts a plug of the torch cable into a socket of the wire feeder and holds it in place with one hand, while clamping the plug to a socket with the other hand. With both hands otherwise occupied with clamping/securing the torch cable to the wire feeder, the user does not have a free hand to steady herself while perched on the robot. The user may be unsteady on the robot and could fall off. Consequently, the user may not properly secure the plug of the cable with the socket resulting in inefficient transfer of electricity, kinking or jamming of weld wire, and/or leakage of fluids.

Moreover, typically, a liner is disposed in the plug and cable to protect weld wire fed through the connector. The liner can be installed in the cable by inserting the liner through the power pin of the plug. Once installed, the liner isolates weld wire from the electrical current and/or a fluid that flows through the power pin and cable. Often, the liner is held in place by a bolt that traverses the power pin and engages a tip of the liner. The bolt may be loosened or tightened with a tool, e.g., screw driver, allen wrench, etc., but over tightening of the bolt may cause damage to the liner, which may cause the weld wire to kink.

In view of at least the aforementioned issues, a connection system for efficiently and safely securing a liner within a torch cable, and/or connecting a torch cable to a power source and/or wire feeder are desirable.

SUMMARY

The present invention relates to a connector for an arc process system. In accordance with at least one embodiment, an electrical connection system includes a multi-diameter power pin with a proximal portion, an engagement portion, a bearing portion, and a threaded distal portion. The proximal portion has a first diameter. The engagement portion extends from the proximal portion and has a second diameter smaller than the first diameter. The bearing portion extends from the engagement portion and has a third diameter smaller than the second diameter. The threaded distal portion extends from the bearing portion and has a fourth diameter smaller than the third diameter.

Additionally or alternatively, the electrical connection system may include a receiving block having a multi-diameter through hole configured to receive a multi-diameter power pin. The receiving block includes a plurality of gaps extending radially from the multi-diameter through hole to an outer surface of the receiving block, a receiving portion disposed between a lateral surface of the receiving block and a first gap of the plurality of gaps, and a clamping portion disposed between the plurality of gaps.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 2B is a perspective internal view of a portion of the wire feeder assembly of claim 2A, according to an embodiment.

FIG. 6C is a cross-sectional view of the socket taken along line A-A of FIG. 6B.

FIG. 6D is a cross-sectional view of a receiving block of the socket taken along line B-B of FIG. 6B.

DETAILED DESCRIPTION

Figure 1:
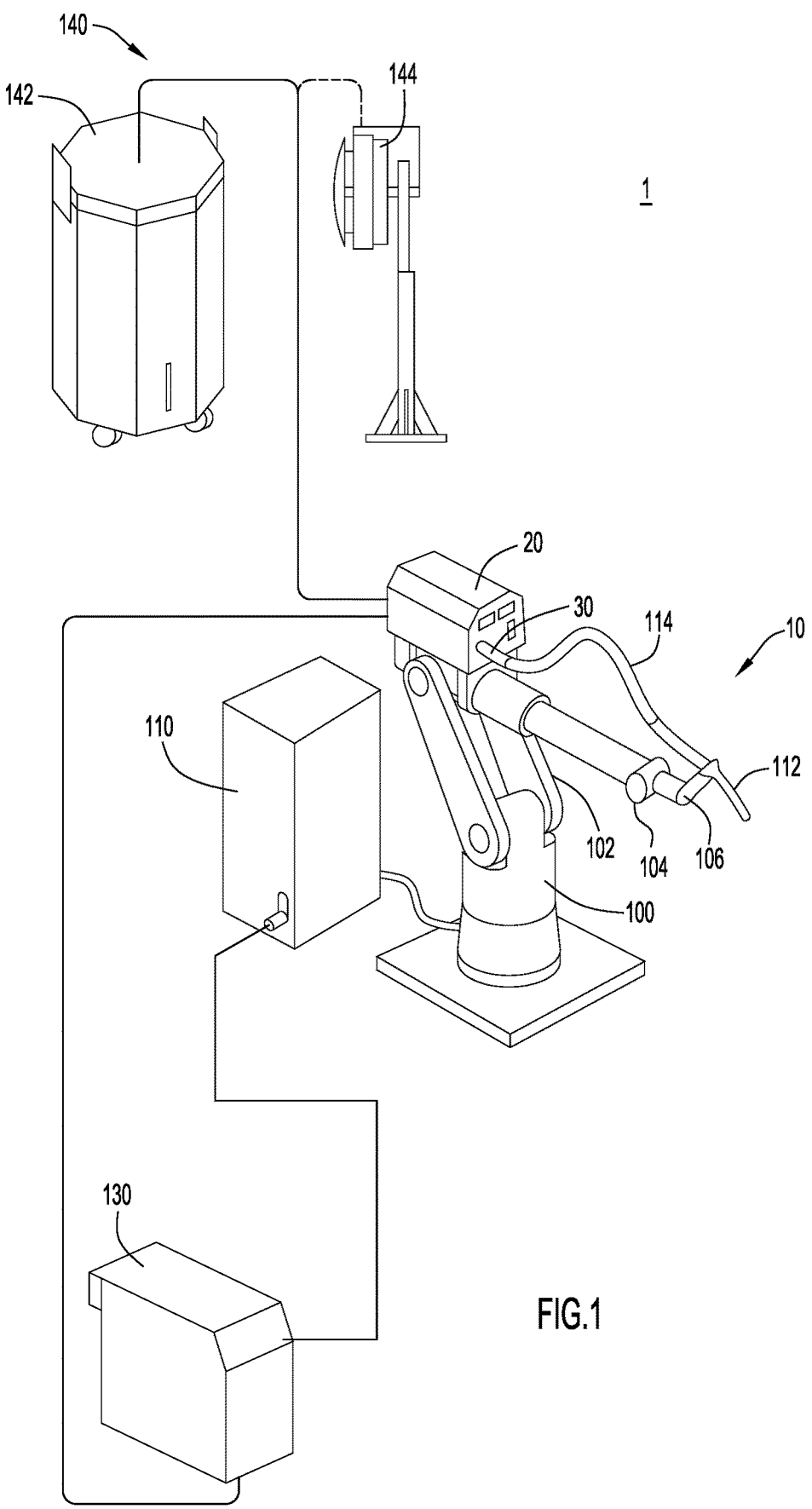
FIG. 1 is a schematic diagram of a robot welding system, according to an exemplary embodiment.

The following description is not to be taken in a limiting sense but is given solely for the purpose of describing the broad principles of the invention. Embodiments of the invention will be described by way of example, with reference to the above-mentioned drawings showing elements and results according to the present invention. Embodiments of the invention are described with reference to a connector for a wire feeder and a welding torch cable, however embodiments are not limited thereto. For example, the connector may be used for connecting and transmitting power between any two components of a high-power system, such as a power source and a cable of a plasma cutting torch.

A conventional power pin of a plug for an arc processing operation (e.g., a welding or plasma cutting operation) generally includes only one or two portions having one or two diameters. For example, a conventional power pin may include an attachment portion for attaching to a cable and a second portion configured to be clamped into and receive one or more gases from a receiving block of a socket. Typically, the entire second portion is clamped in receiving block. That is, a clamp of the receiving block is configured to bear against of the second portion. The second portion generally includes surface features, such as one or more grooves, bores, and/or protrusions configured to receive one or more of process gases, seals, holder screws, etc.

When the conventional power pin is inserted into a receiving block of a socket, a user must hold the plug in place with one hand and clamp the second portion in the receiving block with a second hand. However, if one or more of surface features of the second portion are not be properly aligned with corresponding structures in the receiving block during this two-handed clamping operations, fluids used during the arc processing operation may leak from the plug and socket. Moreover, even if the second portion is properly aligned within the receiving block, one or more of the surface features may obstruct the clamp of the receiving block resulting in a loose connection between the power pin and receiving block. The loose connection may allow the plug to fall out and/or cause a poor electrical connection, resulting in power losses during operation.

Generally, the system and method for connecting a torch cable to a wire feeder presented herein include a plug having a multi-diameter power pin and a socket with a receiving block having a multi-diameter through hole, or bore, for receiving the power pin. The features of the power pin and receiving block allow a user to connect and secure the plug to the socket with one hand. For example, an engagement mechanism disposed in the power pin engages an inner surface of the receiving block in response to inserting the pin into the receiving block. The engagement mechanism maintains a position of the power pin while the user clamps and secures the power pin in the receiving block. Thus, with one hand, the user can insert the power pin into the receiving block and provisionally lock it with the engagement mechanism, let go of the torch cable, and lock the power pin in place with a clamp.

Moreover, a dedicated bearing portion of the power pin corresponding to dedicated clamping portion of the receiving block provides an improved electrical connection between the pin and receiving block as compared to conventional connectors. That is, the dedicated bearing portion and clamp provide unobstructed contact between the power pin and receiving block. Thus, electricity may be efficiently conducted between the receiving block and power pin without the drawbacks of the conventional power pin noted above.

Additionally, the power pin includes a central bore for receiving a liner that extends into the torch cable. The liner isolates a weld wire passing through the connector from an inner surface of the power pin and a conductor of the torch cable. A user can access the central bore of the power pin by removing a liner cap by hand, without using a tool, and insert the liner with the liner tip into the central bore. To secure the liner, the user can dispose the liner cap over the liner tip and a distal portion of the power pin, thereby clamping the liner tip between the liner cap and power pin. To access or replace the liner, a user can remove the liner cap, without a tool, to expose the liner tip and distal end of the power pin. Thus, the liner cap and liner can be easily installed, secured, and/or replaced without the drawbacks of the conventional liner and bolt arrangement noted above. Moreover, the liner cap shape assists in guiding the power pin into the receiving block and prevents weld wire from kinking.

Referring to FIG. 1, a schematic diagram of an exemplary embodiment of a robot welding system 1, according to an embodiment is depicted. The robot welding system 1 includes a robot 10 connected to a controller 110, a wire feeder assembly 20, a power source 130, and wire spool 140. The power source 130 is electrically coupled to the robot 10 and the torch 112 via the controller 110, and the wire feeder assembly 20, respectively. The power source 130 can provide power to components of the robot 10, controller 110, and the wire feeder assembly 20, as well as a process current for an arc process (e.g., a welding or plasma cutting operation). Additionally, the power source 130 may provide a shield gas and/or a process gas for the plasma arc process to the wire feeder. The controller 110 controls the movement of the robot 10 and the plasma arc process. A wire supply 140 provides weld wire to the wire feeder assembly 20. The wire supply 140 may be a bulk pack 142 or a spool 144. In some implementations, the spool 144 is disposed in the wire feeder assembly 20.

In the depicted embodiment, the robot 10 includes a base 100, a first arm 102 pivotably attached to and extending from the base 100, and a second arm 104 pivotably coupled to the first arm 102, opposite the base 100. A torch 112 is disposed on a distal end 106 of the second arm 104, and the wire feeder assembly 20 is disposed at a coupling between the first arm 102 and second arm 104. However, this is just one example of a welding robot and the present application may be applicable to a wide variety of robots.

Regardless of the exact configuration of the robot and the location of the wire feeder assembly 20 on the robot, a torch cable 114 connects the torch 112 to the wire feeder assembly 20. A connector 30 couples the torch cable 114 to the wire feeder assembly 20. The connector includes a socket 40 disposed at the wire feeder assembly 20 (see FIG. 2A) and a plug 50 disposed on the torch cable 114 (see FIGS. 3A-3B). During a weld operation, the torch cable 114 transmits a process current, weld wire, and fluids (e.g., shield gas, process gas, and/or cooling fluid) from the wire feeder assembly 20 through the connector 30 and torch cable 114 to the torch 112.

Figure 2A:
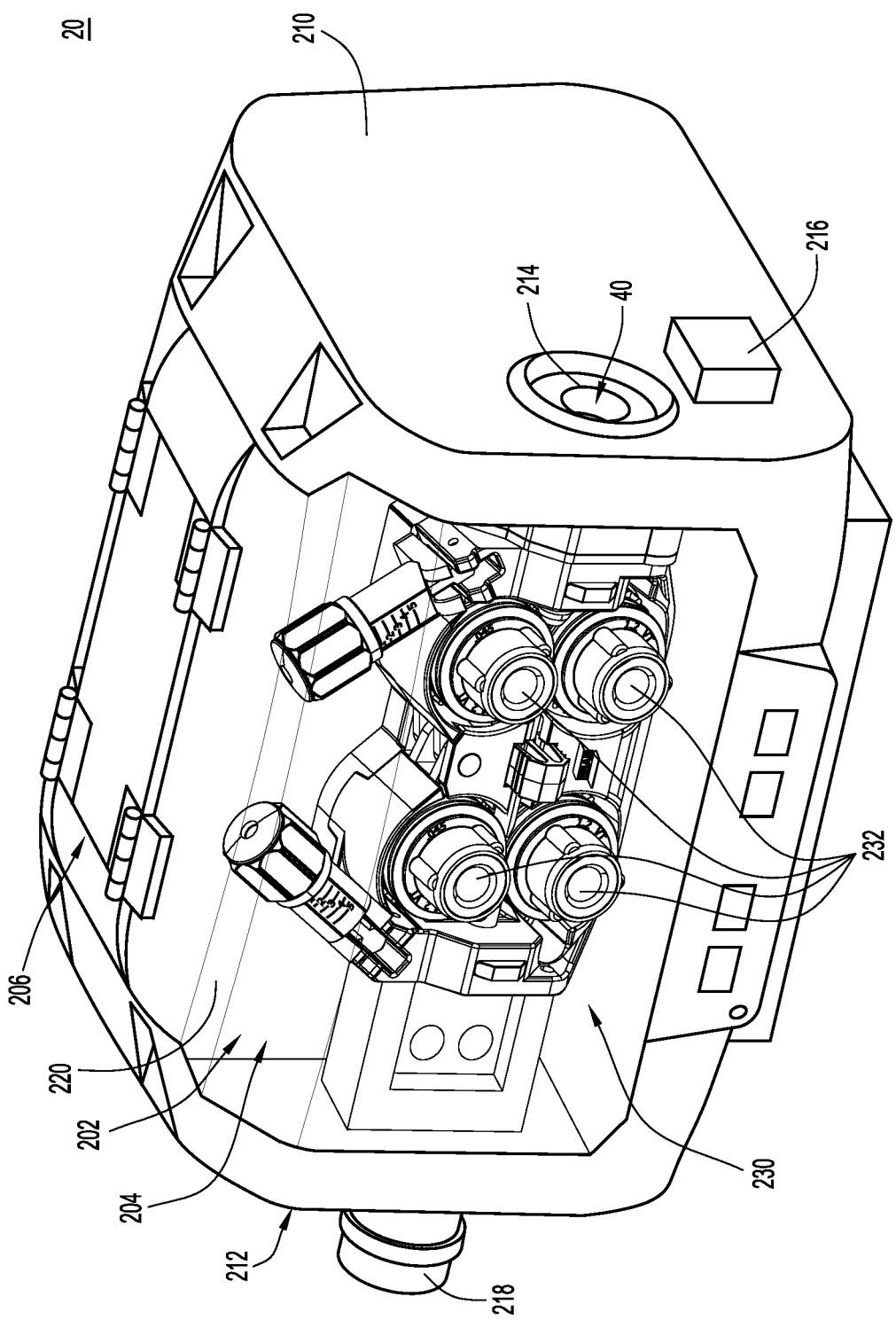
FIG. 2A is a perspective view of a wire feeder assembly with a partially transparent housing, according to an embodiment.
Figure 6A:
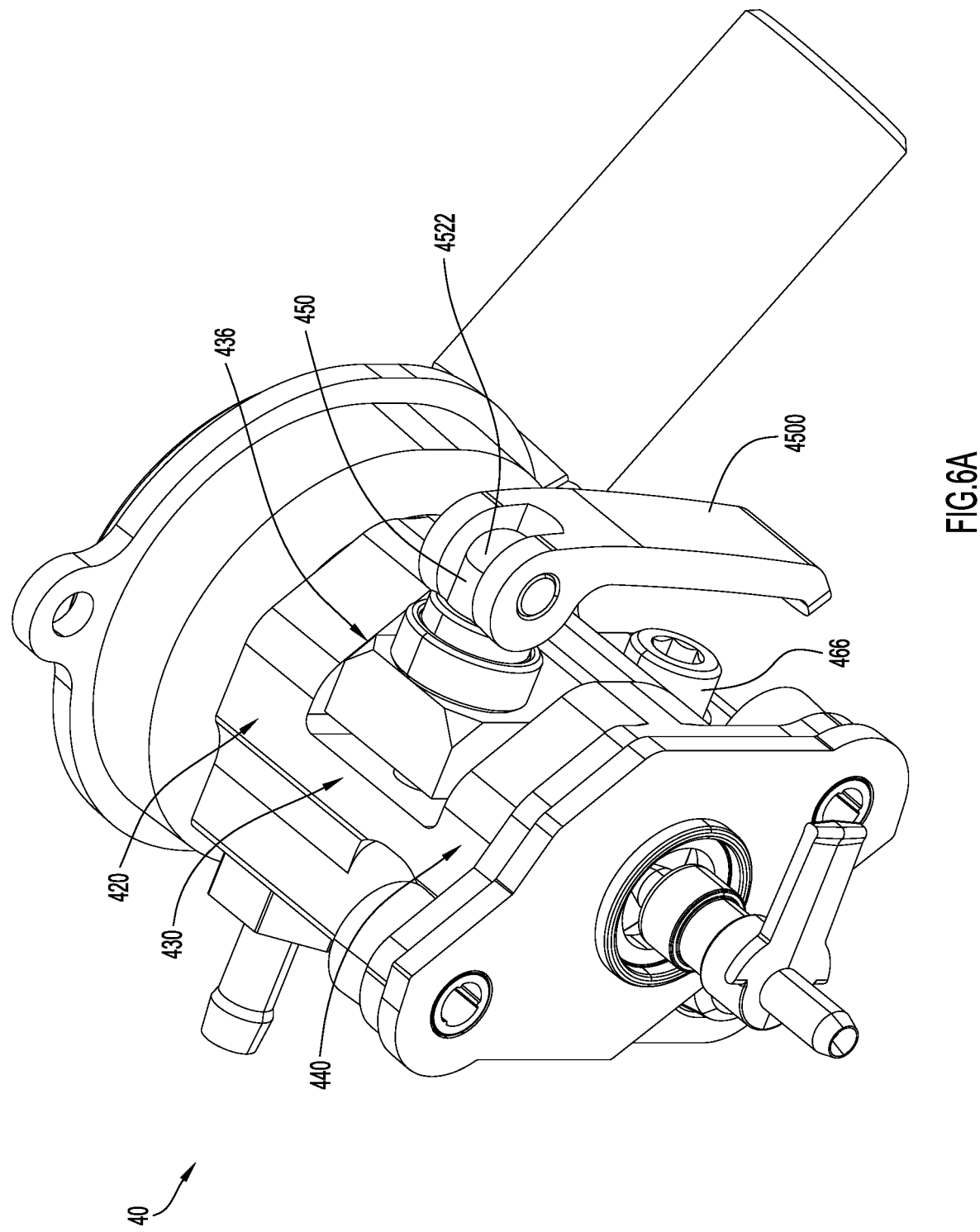
FIG. 6A is a perspective view of the socket according to an embodiment.
Figure 6B:
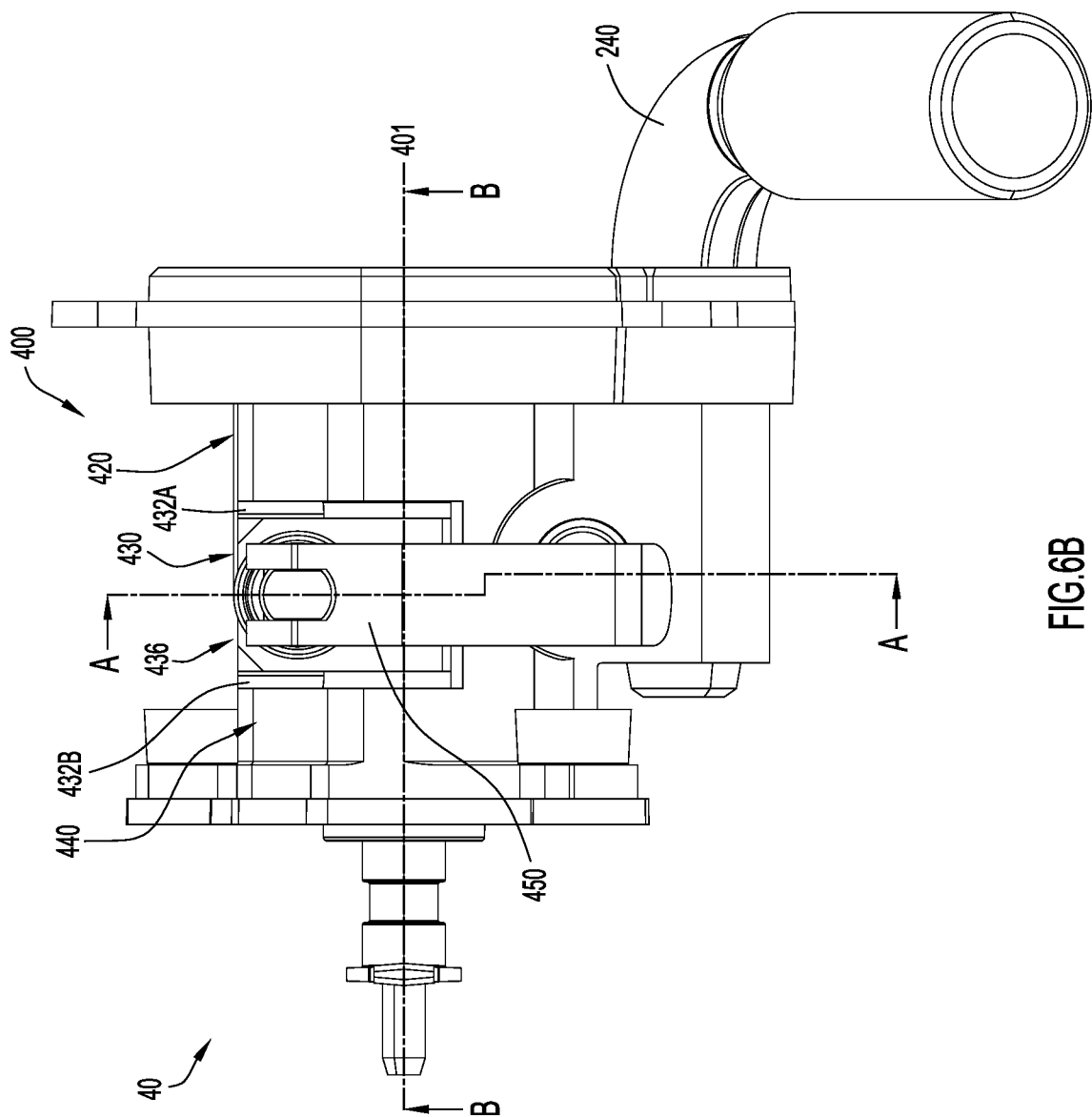
FIG. 6B is a side view of the socket of FIG. 6A.

FIG. 2A is a side perspective view of a wire feeder assembly 20 according to an embodiment. The wire feeder assembly 20 includes an outer housing 200 having a front face 210 and a rear face 212. The front face 210 includes a connector port 214 and a power port 216 that each define passageways through the front face 210 to an interior compartment 202 defined by the housing 200. A divider wall 220 within the housing 200 divides the interior compartment 202 into a wire feeding side 204 and a control side 206. The wire feeding side 204 houses a socket 40 of the connector 30 and a feeder 230 for pulling weld wire through a wire port 218 in the rear face 212. The connector port 214 provides a passage for a plug 50 of the connector 30 to be inserted into the socket 40. A conductor 240 (See FIG. 7) for conducting arc process power can be inserted through the power port 216 and electrically coupled to the socket 40, as is described below with reference to FIGS. 6A-7.

The feeder 230 includes a plurality of wire rollers 232 for pulling the weld wire from a wire supply 140 through the wire port 218 and pushing the weld wire through the socket 40. The control side 206 includes components and/or circuitry for receiving signals and controlling the feeder 230 based on the received signals. In some implementations, the components and/or circuitry may control one or more arc process parameters (e.g., process power, process current, voltage, process gas flow, shield gas flow, cooling fluid flow, wire feed speed, etc.).

FIG. 2B is a perspective view of a portion of the wire feeding side 204 of the interior compartment 202. A receiving block 400 of the socket 40 is disposed between and aligned with the feeder 230 and the connector port 214. The receiving block 400 is configured to receive the plug 50 of the connector 30 and the conductor 240.

Referring to FIGS. 3A-3D, three configurations of the connector 30 are illustrated. The wire feeder assembly 20 accommodating the socket 40 has been omitted for clarity. In configuration C1, the plug 50 is separate and removed from the socket 40 (see FIGS. 3A and 3B). The plug 50 of the connector 30 includes a distal end 52 and a proximal end 54 connected to the torch cable 114. A multi-diameter power pin 500 is disposed at the distal end 52. The socket 40 includes a receiving block 400 having a multi-diameter through hole, or central bore, 402 for receiving the power pin 500.

Figure 3A:
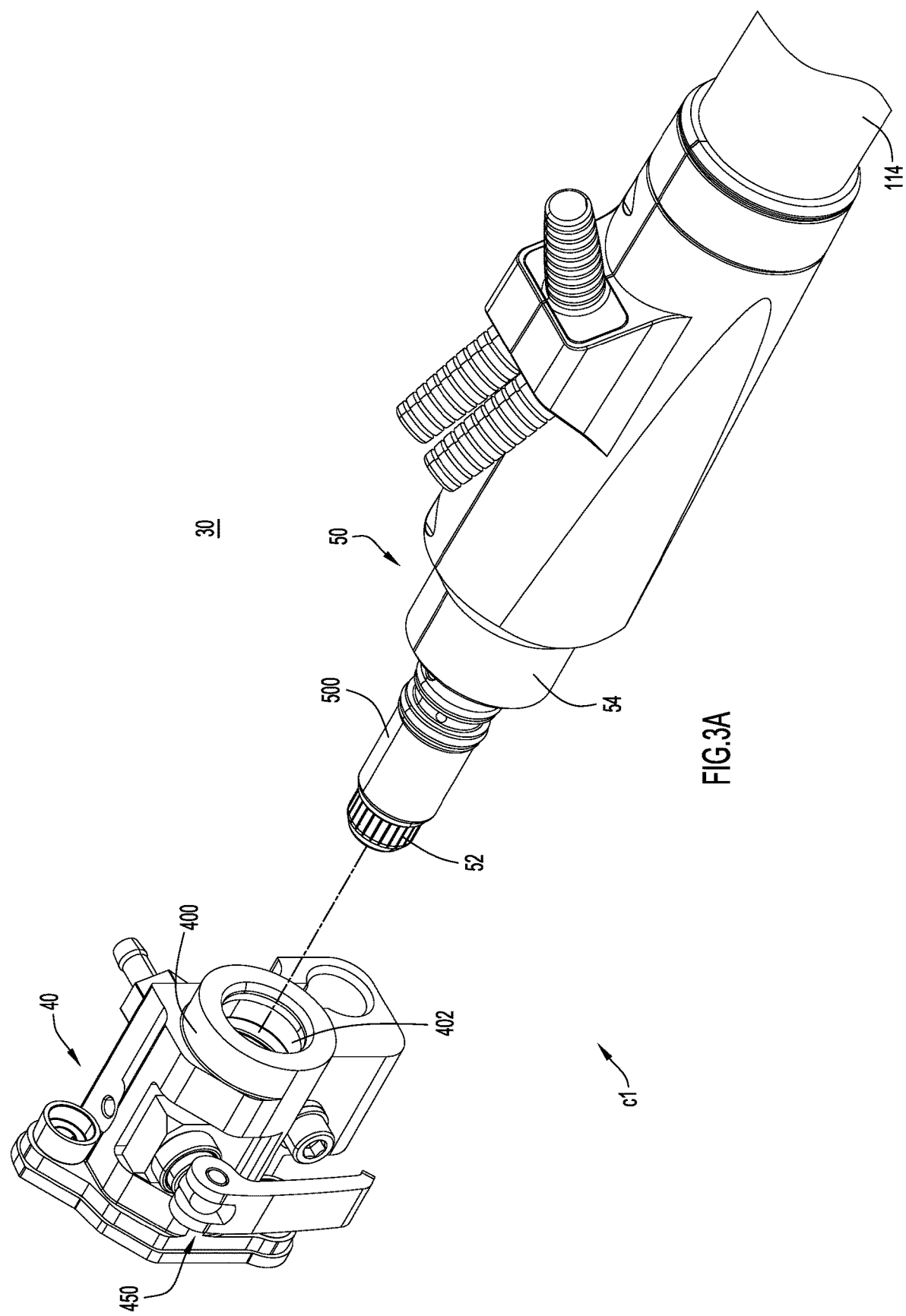
FIGS. 3A and 3B are perspective views of a connector in a first configuration, according to an embodiment.
Figure 3B:
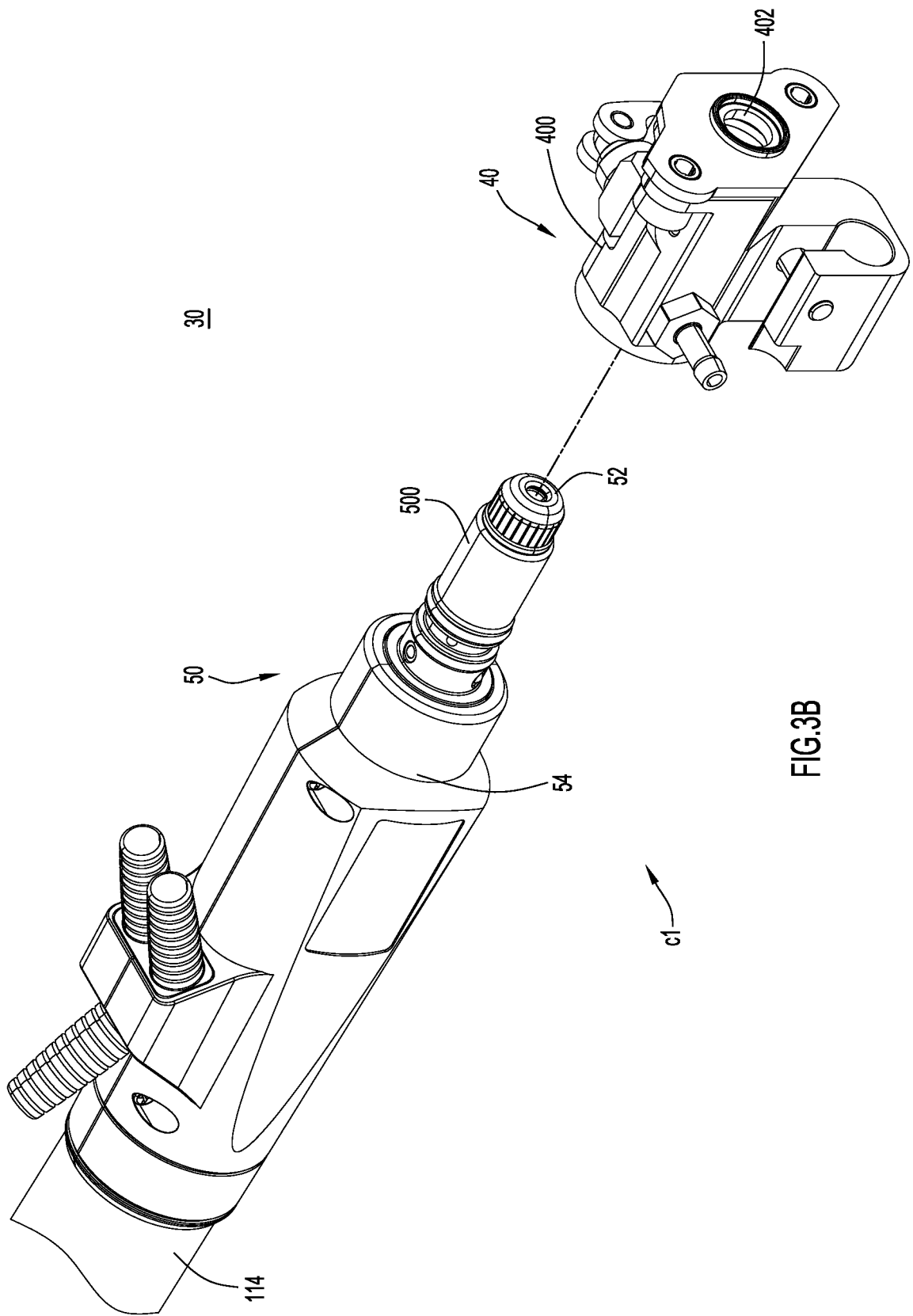
Figure 3C:
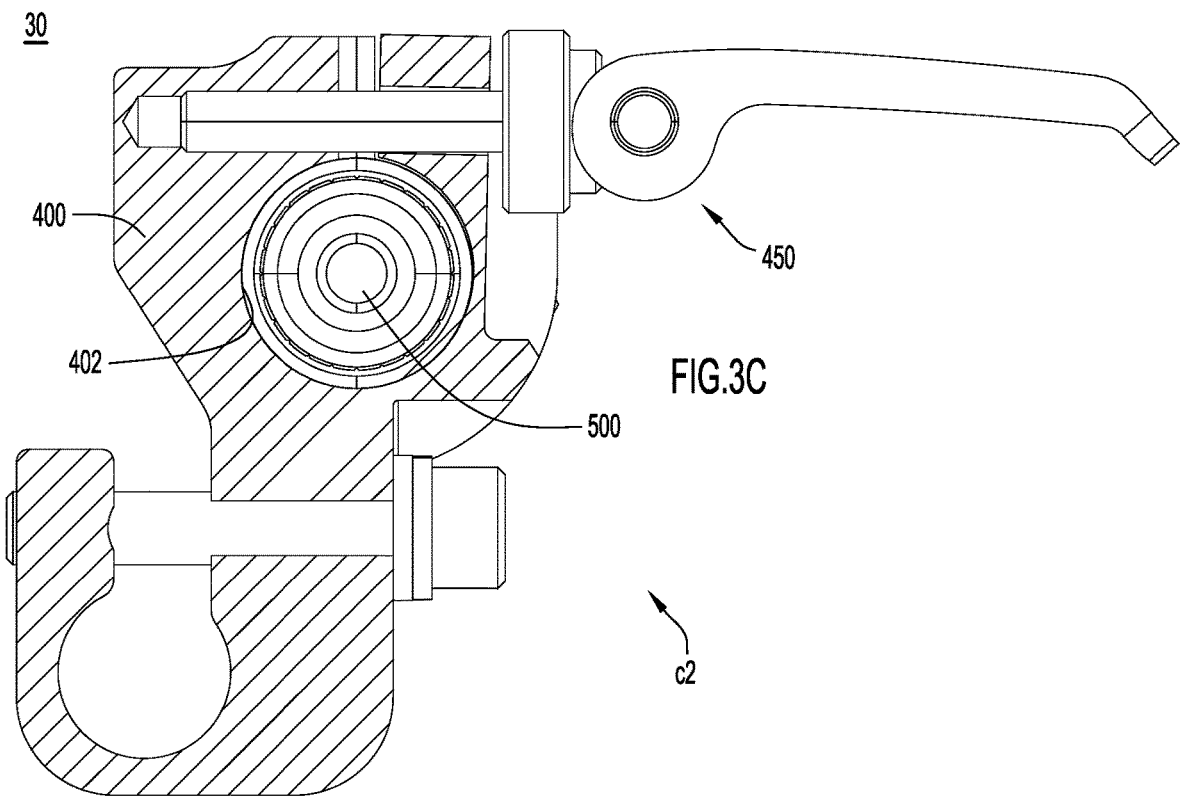
FIG. 3C is a cross-sectional view of the connector of FIGS. 3A and 3B in a second configuration, according to an embodiment.

In configuration C2 the plug 50 is inserted into the socket 40 but is not clamped in place or otherwise locked (see FIG. 3C). The power pin 500 provisionally engages an internal surface of the receiving block 400 defining the central bore 402 and holds the plug 50 in place. Consequently, the plug 50 cannot disengage the socket 40 on its own, but a user can remove the plug 50 by hand, if desired. The provisional engagement configuration C2 between the power pin 500 and receiving block 400 is discussed in detail below with reference to FIG. 7.

Figure 3D:
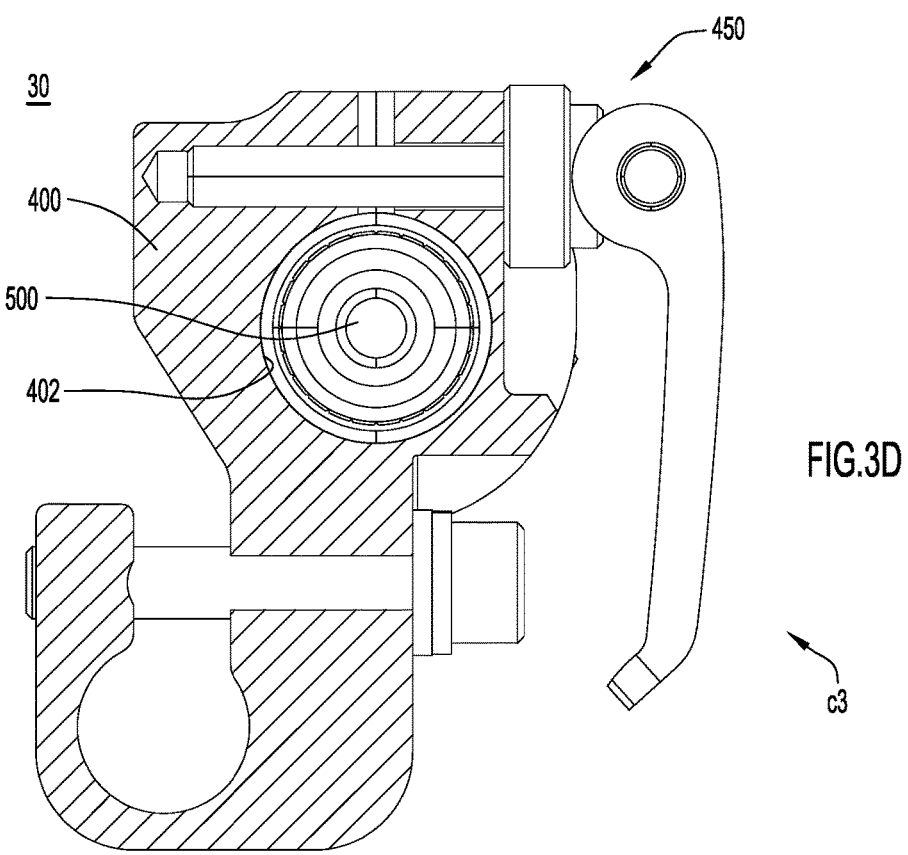
FIG. 3D is a cross-sectional view of the connector of FIGS. 3A and 3B in a third configuration, according to an embodiment.

In configuration C3, the socket 40 receives and clamps, or otherwise locks, the plug 50 in position with a quick release bolt 450 (see FIG. 3D). In the locked configuration C3, the receiving block 400 secures the power pin 500 in the central bore 402 such that the plug 50 cannot be removed from the socket 40 without damaging the connector 30 (i.e., irremovably locks the connector 30). The locked configuration C3 between the power pin 500 and receiving block 400 is discussed in detail below with reference to FIG. 7.

Figure 4A:
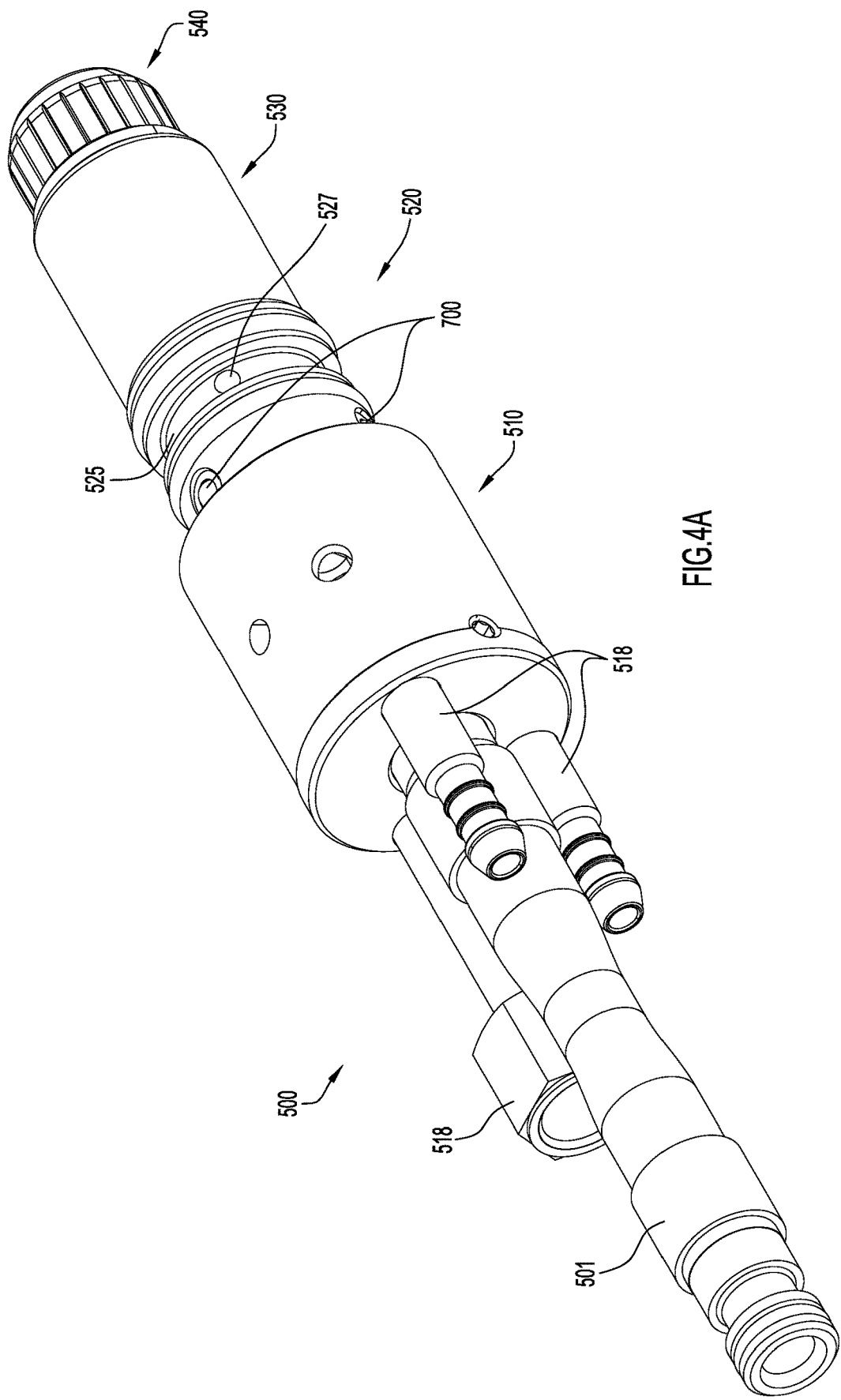
FIG. 4A is a perspective view of a power pin, according to an embodiment.
Figure 4B:
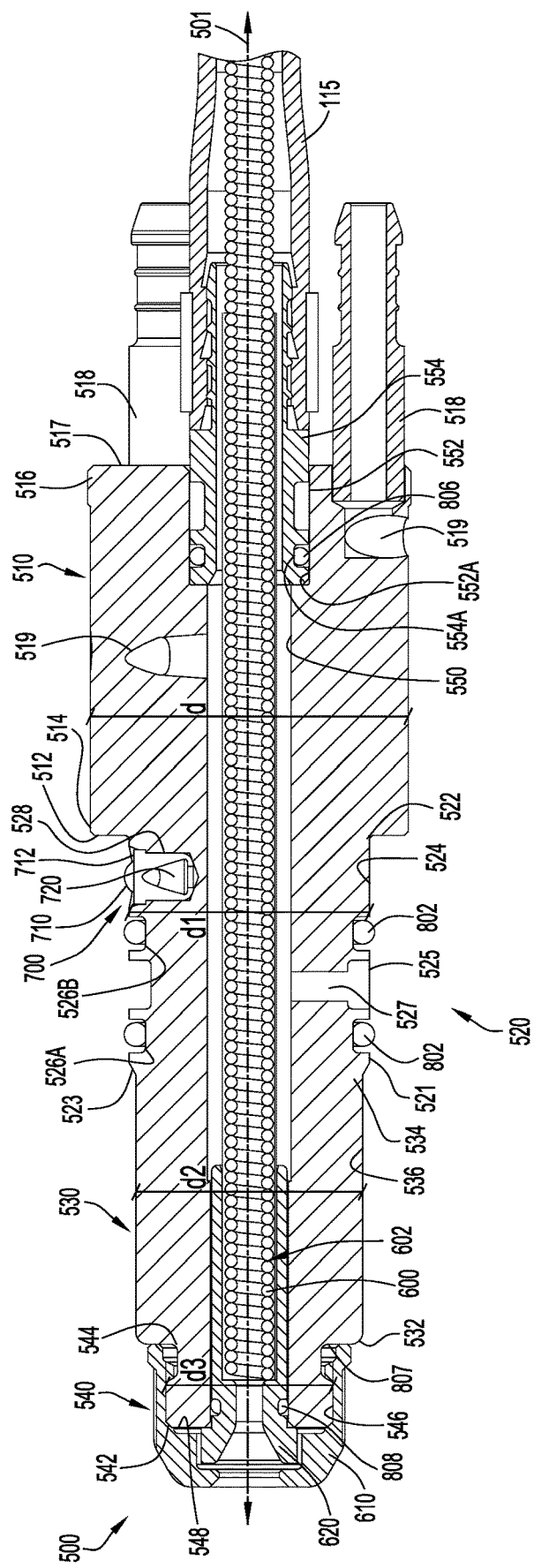
FIG. 4B is a cross-sectional view of the power pin of FIG. 4A.

FIGS. 4A and 4B depict the multi-diameter power pin 500 of the plug 50 with the torch cable 114 omitted for clarity. The power pin 500 is configured to receive arc process power (e.g., a weld or plasma cutting current), shield gases, arc process gases, and/or cooling fluid from the receiving block 400. The power pin 500 is further configured to receive weld wire from the feeder 230. A central bore 550 extends through the length of the power pin 500 along a longitudinal axis 501. The central bore 550 provides a path through the power pin 500 for process and/or shield gases and weld wire. A liner 600 is disposed within the central bore 550. The liner 600 comprises an elongated tube defining a conduit 602 for receiving the weld wire. Accordingly, the liner 600 isolates the weld wire from the inner surface of the power pin 500 and process and/or shield gasses flowing through the central bore 550.

The power pin 500 includes a proximal portion 510, an engagement portion 520 extending from the proximal portion 510, a bearing portion 530 extending from the engagement portion 520, and a threaded distal portion 540 extending from the bearing portion 530. The proximal portion 510 of the power pin 510 has a diameter d. The engagement portion 520 as a diameter d1 smaller than diameter d of the proximal portion 510. The bearing portion 530 has a diameter d2 smaller than diameter d1 of the engagement portion 520. The threaded distal portion 540 has a diameter d3 smaller than diameter d2 of the bearing portion 530.

The proximal portion 510 is configured to attach to the torch cable 114 (See FIG. 3A). A distal end 514 of the proximal portion 510 includes an annular face 512, and a proximal end 516 includes an end face 517 with one or more fluid ports 518 which, in turn, are fluidly coupled to the central bore 550 via internal channels 519. Air may be blown through the fluid ports 518 to blow out any fluids and clean the internal channels 519 and central bore 550. Additionally, or alternatively, cooling fluid may flow through one or more of the internal channels 519 and the ports 518 to cool the torch 112.

The end face 517 further includes a central bore inlet 552 configured to receive a cable adapter 554. The bore inlet 552 has a larger diameter than the central bore 550. The cable adapter 554 is a cylindrical tube that electrically and fluidly couples the power pin 500 and central bore 550 to a cable conductor 115. That is, the cable adapter 554 is configured to receive arc process power (e.g., a weld current) and gas from the power pin 500, and transfer the arc process power and gas to the cable conductor 115. The liner 600 extends through the cable adapter 554 and cable conductor 115. The adapter 554 further includes a seal 806 disposed between an inner surface 552A of the bore inlet 552 and an outer surface 554A of the cable adaptor 554 to prevent fluids from leaking through the bore inlet 552.

The engagement portion 520 includes a distal end 521, a proximal end 522, an annular face 523 at the distal end 521, and an outer surface 524. The annular face 523 is angled with respect to the longitudinal axis 501 of the power pin 500. That is, the annular face 523 is oblique to the longitudinal axis 501 and/or the outer surface 524 of the engagement portion 520 to soften the transition from the engagement portion 520 to the bearing portion 530 (e.g., to form a ramped surface).

The engagement portion 520 also includes an annular groove 525 that extends radially inward from the outer surface 524. The annular groove 525 is fluidly coupled to the central bore 550 by one or more radial channels 527. A process gas and/or shield gas may flow through the annular groove 525 and radial channels 527 to the central bore 550. To prevent leakage, the annular groove 525 is bounded by a first annular seal seat 526A and a second annular seal seat 526B, each of which extend radially inward from the outer surface 524 and receive a seal 802. That is, the first annular seal seat 526A is disposed between the distal end 521 of the engagement portion 520 and the annular groove 525 while the second annular seal seat 526B is disposed between the proximal end 522 of the engagement portion 520 and the annular groove 525. Put still another way, the first annular seal seat 526A is disposed upstream from the annular groove 525 and the second annular seal seat is disposed downstream of the annular groove 525.

The engagement portion 520 further includes one or more radial bores 528 with one or more engagement mechanisms 700 disposed therein (e.g., one mechanism 700 per bore 528). Each engagement mechanism 700 is configured to engage an inner surface of the receiving block 400 of the socket 40 and provisionally hold the power pin 500 in place. That is, when the plug 50 is inserted into the socket 40, the engagement mechanism 700 prevents the power pin 500 from sliding out of the receiving block 400.

In the depicted embodiment, the engagement mechanism 700 comprises a ball 710 and spring 720 disposed in the radial bore 528. The spring 720 is disposed radially inward of the ball 710 and exerts a radial outward force on the ball 710. The radial outward force causes a portion of the ball 710 to extend past the outer surface 524 of the engagement portion 520 by a desired distance. The engagement mechanism 700 may further include a radial stop 712 to prevent the portion of the ball 710 from extending beyond the desired distance from the outer surface 524, and/or completely exiting the radial bore 528.

The ball 710 is capable of translating completely within the radial bore 528 if a radially inward force, greater than the radial outward force from the spring, is applied to the ball 710. That is, a portion of the ball 710 extending past the outer surface 524 may be pushed into radial bore 528 such that a portion of the ball 710 does not radially extend beyond the outer surface 524. However, forces applied in a direction perpendicular to the radial force from the spring (i.e., forces acting axially with respect to the power pin) may not cause the ball 710 to translate into the radial bore 528. Thus, when the engagement mechanism 700 engages the receiving block 400, the plug 50 may be prevented from translating along the longitudinal axis 501.

That all said, embodiments are not limited to an engagement mechanism 700 having a ball 710 and spring 720 configuration. As an example, in some implementations, the engagement mechanism 700 may be a resilient member radially extending from the outer surface 524 of the engagement portion 520. Specifically, the engagement mechanism 700 may include an annular protrusion extending from the outer surface 524. As another example, the engagement mechanism may be a metal, a plastic, and/or a rubber ring disposed in a second annular groove in the outer surface 524. As yet another example, the engagement portion 520 may include a second annular groove configured to receive an engagement mechanism disposed in the central bore 402 of the receiving block 400.

While the engagement mechanism 700 is configured to engage the receiving block 400, the bearing portion 530 of the power pin 500 is configured to be clamped by the receiving block 400. The bearing portion 530 is dedicated to providing a large contact area, free of obstructions, for clamping by the receiving block 400. The bearing portion 530 includes distal end 532, a proximal end 534, and a smooth outer surface or bearing surface 536 disposed therebetween. Said another way, the outer surface 536 does not include any surface protrusions or depressions. The smooth outer surface 536 provides consistent contact between the bearing portion 530 and an inner surface of the receiving block 400 in the clamped configuration C3. The consistent contact provides even clamping force along the bearing portion 530 and allows for efficient transmission of electricity between the receiving block 400 and power pin 500; thus reducing power losses.

Still referring to FIGS. 4A and 4B, the distal threaded portion 540 is configured to receive and secure the liner 600 with a liner cap 610. The distal threaded portion 540 includes a first annular face a distal end 542, a proximal end 544, a threaded outer surface 546, and a distal annular face 548 disposed at the distal end 542. The central bore 550 extends through the distal annular face 548 and receives the liner 600. The threaded liner cap 610 is disposed over a tip 620 of the liner 600 and the distal threaded portion 540. The distal threaded portion 540, the liner 600, the liner cap 610 and liner tip 620 are concentrically arranged about longitudinal axis 501. The distal threaded portion 540 and the liner cap 610 cooperate to hold the liner tip 620 and liner 600 in place.

Figure 5:
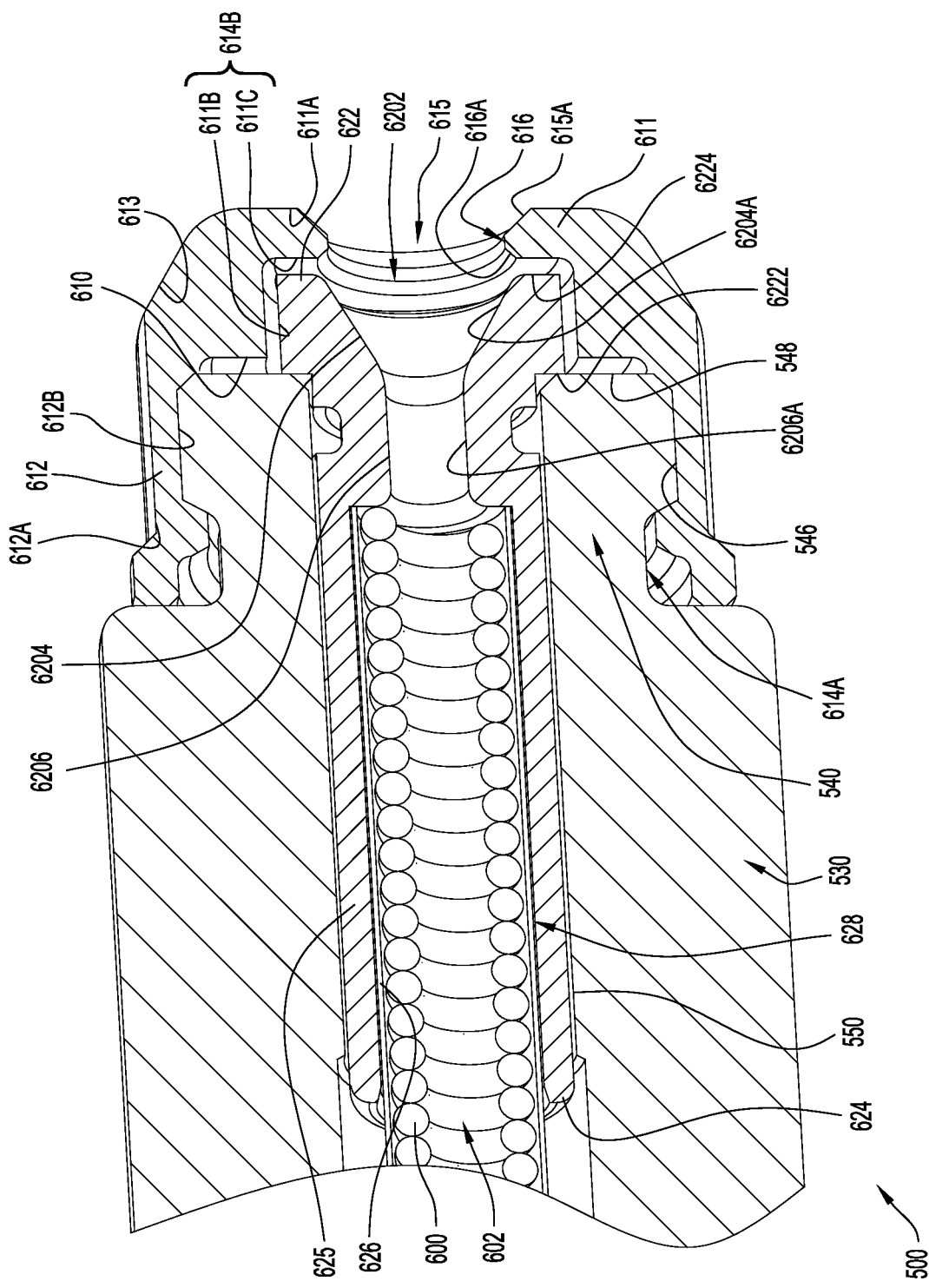
FIG. 5 is a cross-sectional view of the distal end of the power pin of FIG. 4A during installation into a plug.

Referring to FIG. 5, the configuration of the liner 600, the liner cap 610, the liner tip 620, and the distal threaded portion 540 of the power pin 500 is depicted. The liner cap 610 includes a top wall 611 having an annular face 611A and a circumferential sidewall 612 having an outer surface 612A and an inner surface 612B. The liner cap 610 further includes a chamfered surface 613 between the annular face 611A and the outer surface 612A. The chamfered surface 613 helps guide the power pin 500 into the central bore 402 of the receiving block 400.

The liner cap 610 further includes a first cavity portion 614A and second cavity portion 614B. The inner surface 612B of the sidewall 612 defines the first cavity portion 614A, and inner surfaces 611B and 611C define the second cavity portion 614B. The first cavity portion 614A is configured to receive the distal threaded portion 540 of the power pin 500. The inner surface 612B is threaded and configured to engage the threaded outer surface 546 of the threaded portion 540 of the power pin 500. The second cavity portion 614B is configured to accommodate a portion of the liner tip 620 when the cap 610 is coupled to the threaded portion 540 and has a smaller diameter than a diameter of the first cavity portion 614A. Accordingly, a user may unscrew the cap 610 to access threaded portion 540, the liner 600 and liner tip 620 for maintenance and/or to replace the liner 600 and liner tip 620.

The liner cap 610 further includes a cap inlet 615 disposed in the top wall 611. The cap inlet 615 has a frustoconical shape defined by a cap inlet surface 615A. The frustoconical cap inlet 615 transitions to an expanding outlet 616 defined by outlet surface 616A. The cap inlet 615 and outlet 616 are fluidly coupled to the second cavity portion 614B. That is, the cap inlet 615 and outlet 616 provide a passage through the top wall 611 to the second cavity portion 614B.

The liner tip 620 includes a distal end 622, a proximal end 624, and an elongate member, or ferrule, 625 extending from the distal end 622 to the proximal end 624. The elongate member 625 includes an inner surface 626 that defines a channel 628 for receiving a portion of the liner 600. The distal end 622 has a larger diameter than diameters of the elongate member 625 and of the central bore 550. The difference in diameters between the distal end 622 and the elongate member 625 defines a first annular face 6222. The first annular face 6222 is configured to abut the distal annular face 548 of the distal threaded portion 540. Consequently, the distal end 622 of the tip 620 is prevented from passing through the bore 550.

The distal end 622 further includes a second annular face 6224 opposite the first annular face 6222 and a tip inlet 6202. The tip inlet 6202 has a frustoconical portion 6204 defined by a tip inlet inner surface 6204A, and a bore portion 6206 having substantially constant diameter defined by bore inner surface 6206A. The inlet 6202 is fluidly coupled to the conduit 602 of the liner 600.

When assembled, the liner 600 and tip elongate member 625 are inserted into the central bore 550 through the distal threaded portion 540 of the power pin 500. The first annular face 6222 of the distal end 622 of the liner tip 620 abuts the distal annular face 548 of the threaded portion 540 and prevents the liner tip 620 from passing completely through the bore 550. The liner cap 610 cooperates with the distal threaded portion 540 of the power pin 500 to secure the liner 600 and liner tip 620 in place. That is, the liner cap 610 receives the threaded portion 540 in the first cavity portion 614A and receives the distal end 622 of the liner tip 620 in the second cavity portion 614B.

Meanwhile, the distal annular face 548 of the threaded portion 540 and the inner surfaces 611B and 611C of the second cavity portion 614B confine the distal end 622 of the liner tip 620. For example, distal annular face 548 can bear against the first annular face 6222 of the distal end 622, and inner surface 611C of the cap 610 can bear against the second annular face 6224. The threaded inner surface 612B of cap sidewall 612 engages the outer threaded surface 546 to secure the liner cap 610 to threaded portion 540 of the power pin 500. In other words, threads disposed on the inner surface 612B engage threads of the outer surface 546. Consequently, the distal end 622 is restrained between the distal threaded portion 540 and the liner cap 610, securing the liner tip 620 to the distal threaded portion 540. Because the liner 600 is secured to an inner surface 626 of the elongate member 625 of the liner tip 620, the liner 600 is also secured in place.

Now referring to FIGS. 6A-6D, the socket 40 and its receiving block 400 are depicted. The receiving block 400 includes a multi-diameter central bore 402 extending along a longitudinal axis 401 of the receiving block 400 that is configured to receive the multi-diameter power pin 500. The receiving block 400 also includes receiver portion 420, a dedicated clamping portion 430, a distal portion 440, and a quick release bolt 450 operatively coupled to the clamping portion 430. Still further, the receiving block 400 includes a U-shaped coupler 460 extending from a bottom of receiver portion 420 and clamping portion 430 that is configured to receive the arc process power conductor 240.

The multi-diameter central bore 402 extends through the receiver portion 420, the clamping portion 430, and the distal portion 440. The central bore 402 has a diameter D1 through the receiver portion 420, a variable diameter D2 through the clamping portion 430 and a diameter D3 through the distal portion 440. D3 is less than diameter D1 while D2 is adjustable to a diameter that is also less than D1. Diameter D2 is varied by tightening of the quick release bolt 450 coupled to the clamping portion 430. The arrangement between the quick release bolt 450 and clamping portion 430 are discussed below.

The receiver portion 420 includes a bore inlet 402A defining a lateral annular face 421A of the receiving block 400. The bore inlet 402A has a frustoconical shape defined by a receiver inlet surface 421B. An inner surface 420A of the receiver portion 420 defines a receiver bore section 402B of the central bore 402 having a diameter D1. A first annular groove 422 (configured to receive the engagement mechanism 700 of the engagement portion 520) and second annular groove 424 (configured to cooperate with the annular groove 525 of the engagement portion 520 to define a passageway for arc process gases) extend radially outward from the inner surface 420A. The first annular groove 422 has a curved surface 422A. A fluid channel 426 extends radially outward from the second annular groove 424 and ultimately to an external surface of the receiving block 400. The fluid channel 426 fluidly couples the second annular groove 424 to a fluid supply of the feeder assembly 20.

The receiving portion 420 further defines a frustoconical receiver outlet 428 of the receiver bore section 402B opposite the bore inlet 402A. The receiver outlet 428 is defined by an outlet surface 428A extending radially inwards and axially towards the clamping portion 430. Said another way, a diameter of a section of the central bore 402 decreases along the receiver outlet 428 toward the clamping portion 430.

The clamping portion 430 includes an inner surface 430A defining a clamping bore section 402C. The clamping portion 430 includes a first radial gap 432A, a second radial gap 432B parallel to the first radial gap 432A, and a third radial gap 434 extending from the first radial gap 432A to the second radial gap 432B. The first, second and third radial gaps 432A, 432B, and 434 extend radially from the clamping bore section 402C to one or more outer surfaces of the receiving block 400. Additionally, the first, second, and third radial gaps 432A, 432B, and 434 define a resilient finger 436 having an upper portion 436A that receives a quick release bolt 450.

The upper portion 436A can translate through the third radial gap 434 in response to a force received from the quick release bolt 450. That is, a length of the third radial gap 434 can be varied in response to loosening or tightening of the quick release bolt 450. For example, tightening the quick release bolt 450 decreases the length of the third radial gap 434 and the diameter D2 of the clamping bore section 402C. Conversely, loosening the quick release bolt 450 increases the length of the third radial gap 434 and increases the diameter D2 of the clamping bore section 402C. Consequently, the diameter D2 of the clamping bore section 402C is variable based on the force applied by the quick release bolt 450.

In the depicted embodiment, the quick release bolt 450 is disposed in a laterally extending bore 438 that extends from an outer surface of upper portion 436A of the finger 436 and into the clamping portion 430 of the receiving block 400. The quick release bolt 450 includes a handle 4500 and a bolt 4520. The handle 4500 includes a proximal end 4502 and a distal end 4504. The proximal end 4502 includes a cam 4506. The bolt 4520 includes a proximal end 4522 rotatably coupled to the proximal end 4502 of the handle 4500, and a threaded distal end 4524 for engaging threads of the lateral bore 438. However, the quick release bolt 450 is merely an example of a tightening mechanism that may act on clamping portion 430 (and particularly on finger 436) to lock a power pin 500 in the receiving block 400.

Moreover, in the depicted embodiment, the quick release bolt 450 can be screwed into the lateral bore 438 with the handle 4500 in a released position (e.g., configuration C2 shown in FIG. 3C). Additional force may be applied to the finger 436 by rotating the handle from the released position to the clamped position (e.g., configuration C3 shown in FIG. 3D). Rotating the handle 4500 causes the cam 4506 to apply additional force to the finger 436 and decrease the lateral length of the gap 434. Accordingly, the finger 436 can translate in response to the handle 4500 rotating from the clamped position to the released position and/or from the released position to the clamped portion. However, again, this tightening is merely an example and in other embodiments any tightening mechanism may be tightened in any manner now known or developed hereafter.

Still referring to FIGS. 6A-6D, the distal portion 440 of the receiving block 400 includes an inner surface 440A defining a distal bore section 402D having a diameter D3. The diameter D3 of the distal bore section 402D is less than the diameter D1 of the receiver bore section 402B. The distal bore section 402D is configured to receive the distal portion 540 of the power pin 500.

Referring to FIG. 6C, the U-shaped coupler 460 extending from a bottom of receiver portion 420 and clamping portion 430 receives the arc process power conductor 240. In the depicted embodiment, the coupler 460 includes a main body section 461 and a clamping section 462 having an inner surface 463 that defines a longitudinally extending receiving bore 464 configured to receive the conductor 240. That is, the receiving bore 464 extends in a direction parallel to, and radially offset from, the longitudinal axis 401 of the receiving block 400 to receive the conductor 240. However, in other embodiments, the coupler 460 might have a different shape or position that define the receiving bore 464 in a different configuration.

Moreover, in the depicted embodiment, a radial gap 467 between the main body section 461 and the clamping section 462 extends radially upward from the receiving bore 464. A first through hole 465A extends laterally through the main body section 461, and a second through hole 465B, coaxial with the firsts through hole 465A, extends laterally through the clamping section 462. The first and second through holes 465A, 465B receive a clamping bolt 466. The clamping bolt 466 applies a force to pull the clamping section 462 towards the main body section 461 until the inner surface 463 of the coupler 460 contacts and bears against an outer surface 242 of the conductor 240 thereby securing the conductor 240 within the receiving bore 464. Accordingly, the conductor 240 is secured and electrically coupled to the coupler 460, and thus, the receiving block 400. However, again, this is merely an example and other embodiments may secure the conductor 240 to the coupler 460 in any desired manner.

Figure 7:
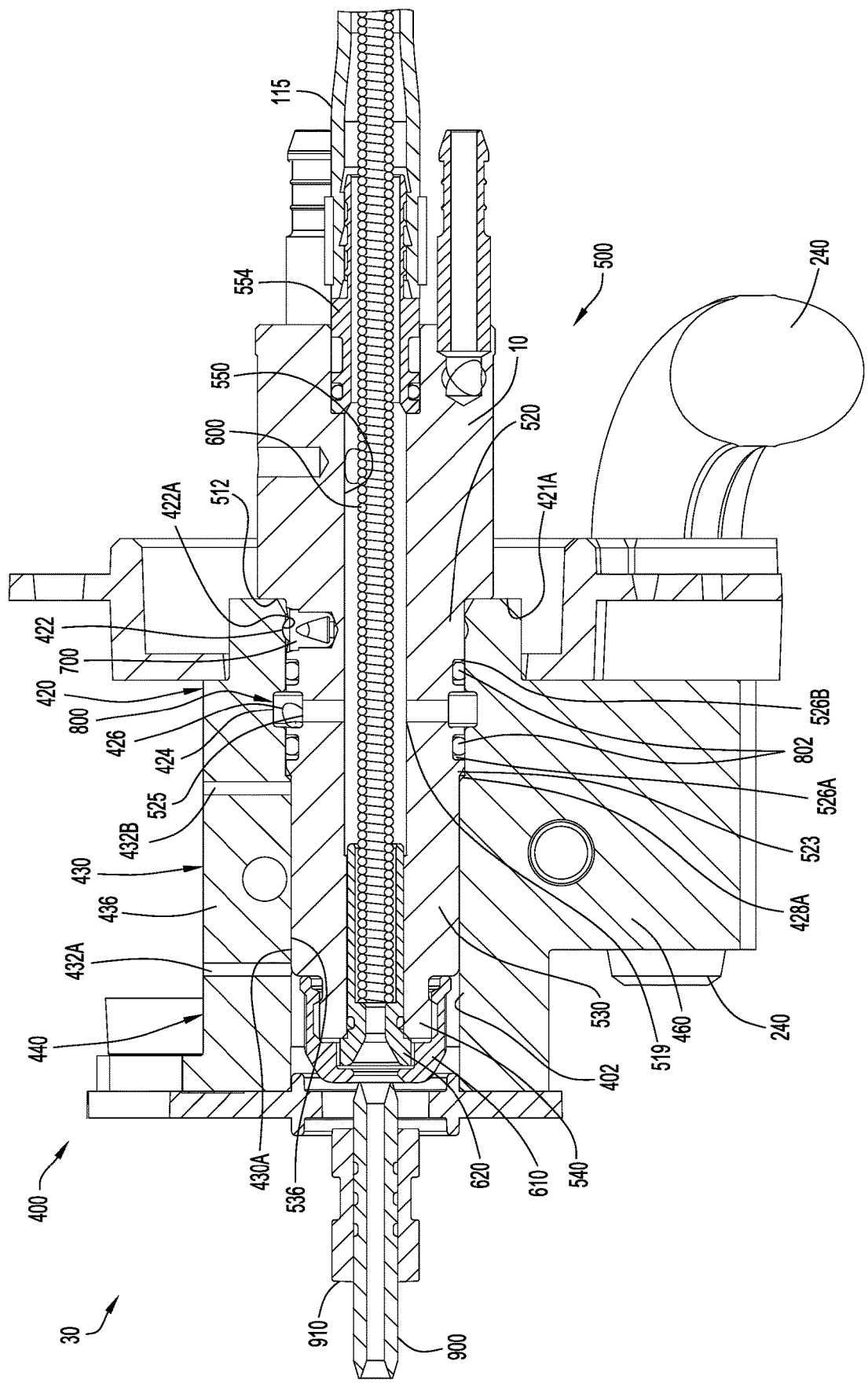
FIG. 7 is a cross-sectional view of the connector in the third configuration.

Referring to FIG. 7, a cross-sectional view of the connector 30 with the multi-diameter power pin 500 and the arc process power conductor 240 inserted into the receiving block 400 is shown. The connector 30 is shown in the third configuration C3 with power pin 500 clamped to the receiving block 400. In this configuration, the engagement portion 520 is axially aligned with and accommodated within the receiving portion 420, the bearing portion 530 is axially aligned with and accommodated within the clamping portion 430 and the threaded distal portion 540 is axially aligned with and accommodated within the distal portion 440. To accommodate the portions of the power pin 500 with the portions of the receiving block 400, the diameter D1 of the receiver bore section 420B (see FIG. 6D) is slightly larger than the diameter d1 of the engagement portion 520 (See FIG. 4B). Similarly, the variable diameter D2 of the clamping bore section 402C and diameter D3 of the distal portion 440 is slightly larger than diameter d2 of the bearing portion 530 and diameter d3 of the distal threaded portion 540, respectively (see FIGS. 4B and 6D).

Still referring to FIG. 7, the receiver portion 420 abuts the proximal portion 510 of the power pin 500 to axially align each portion of the power pin 500 with each corresponding portion of the receiving block 400. That is, the annular face 512 of the proximal portion 510 faces and abuts the lateral annular face 421A of the receiver portion 420. With the power pin 500 aligned with the receiving block 400, the second annular groove 424 of the portion 420 cooperates with the annular groove 525 of the engagement portion 520 to form an annular fluid channel 800. Additionally, the engagement mechanism 700 engages the first annular groove 422 of the receiver portion 420 to provisionally hold the power pin 500 in the central bore 402.

For example, the spring 720 of the engagement mechanism 700 pushes a portion of the ball 710 into the first annular groove 422. The ball 710 and first annular groove 422 prevent axial movement of the power pin 500, unless a radial force sufficient to overcome the force from the spring 720 is applied to the ball 710. An axial force may be transferred through the power pin 500 to the ball 710 which bears against a portion of the first annular groove 422. A portion of the axial force can be converted into a radial force in response to the ball 710 bearing against the curved surface 422A of the first annular groove 422. Therefore, if the connector 30 is moved out of its third configuration C3 (e.g., to configuration C2) a user can disengage the engagement mechanism 700 by pulling with sufficient axial force such that the curved surface 422A converts the axial force into a radial force greater than the spring force.

As mentioned, embodiments are not limited to one engagement mechanism 700 having a ball 710 and spring 720 arrangement. In some implementations the engagement portion 520 may include a plurality of engagement mechanisms 700. For example, the engagement portion 520 may include two, three, four, or more engagement mechanisms 700 to engage the first annular groove 422 of the receiver portion 420. In some implementations, the engagement mechanism 700 may be a resilient annular ring that protrudes from or is disposed on the engagement portion 520. For example, the engagement mechanism may be a plastic, metal, and/or rubber ring secured to the engagement portion 520. Alternatively, the engagement mechanism 700 may be a protrusion extending from the outer surface 524 of the engagement portion 520. Alternatively, one or more engagement mechanisms 700 may be disposed in the receiver portion 420 and the first annular groove 422 may be disposed at the engagement portion 520.

In addition to receiving the engagement mechanism 700, the receiver portion 420 fluidly couples the feeder 20 to the torch cable 114 via the engagement portion 520. For example, fluid channel 426, the annular fluid channel 800 (e.g., annular grooves 424 and 525), the internal channels 519, the pin central bore 550, and the cable conductor 115 form a fluid passageway from the wire feeder assembly 20 to the torch 112. The seals 802 disposed in the first and second annular seal seats 526A, 526B of the engagement portion 520 prevent leakage of the process gas from the annular fluid channel 800. An additional sealing means of the receiving portion 420 is provided by the annular face 523 butting the outlet surface 428A and the annular face 512 abutting the lateral annular face 421A. Accordingly, process gas flowing through the fluid channel 800 is prevented from leaking out of the receiver bore section 402B (see FIG. 6D) and past the receiver portion 420. To further protect the connector 30 from fluid leaks, seals 806 prevent the process gas from leaking past the cable adapter 554, and seals 807 and 808 prevent process gas from leaking past the liner cap 610 and liner tip 620, respectively. The seals 802, 806, 807, 808 may be O-rings.

Still referring to FIG. 7, once the engagement portion 520 engaged and fluidly coupled to the receiver portion 420, a user may clamp the clamping portion 430 to the bearing portion 530 using the quick release bolt 450 (see FIGS. 3C-3D) to place the connector 30 into its clamped configuration C3. This presses the finger 436 into gap 434 until the inner surface 430A presses or bears against the bearing surface 536 of the bearing portion 530. As discussed above, the bearing surface 536 does not include any surface features that obstructs contact of the inner surface 430A to the bearing surface 536. Therefore, the finger 436 can effectively clamp the bearing portion 530 in place, and secure the plug 50 in the socket 40. Moreover, the contact between the inner surface 430A and the bearing surface 536 electrically couples the receiving block 400 to the power pin 500.

During operation, power from the conductor 240 is conducted through the receiving block 400 to the power pin 500 and then conducted through the cable adapter 554 to the cable conductor 115. For example, an electric current is conducted from the conductor 240 to the U-shaped coupler 460, through the receiving block 400 where the electricity is conducted from inner surface 430A to the bearing surface 536 of bearing portion 530. The current is then conducted through the cable adapter 554 and the cable conductor 115 to the torch 112. Additionally, process gas flows from the wire feeder assembly 20 through fluid channel 426 into the annular fluid channel 800. The process gas then passes through pin internal channels 519, the pin central bore 550, the cable adapter 554, and the cable conductor 115 to the torch 112.

In addition to power and process gas, a weld wire is guided through the power pin 500 and torch cable 114 to the torch 112. As discussed above, weld wire is pulled from a wire supply 140 by wire rollers 232 and is isolated from electrical currents and process gases by the liner 600. A wire guide 900, supported in the feeder assembly 20 by a guide support 910, receives the weld wire from the wire rollers 232 and guides the weld wire to the multi-diameter central bore 402. The distal threaded portion 540 with liner cap 610 and the cap inlet 615 are radially aligned with the wire guide 900. The weld wire enters the cap 610 via the cap inlet 615. The cap inlet surface 615A guides the weld wire radially inwards and towards the liner tip inlet 6202. The tip inlet inner surface 6204A guides the weld wire radially inwards and towards the liner conduit 602. Both the cap inlet surface 615A and the tip inlet inner surface 6204A prevent kinking and/or jamming of the weld wire after it exits the wire guide 900. The liner 600 (which extends through the torch cable 114 to the torch 112) guides the weld wire to the torch 112 where it is consumed in an arc welding process. The liner 600, liner cap 610, and liner tip 620 isolate weld wire received in the conduit 602 from gas flowing through the power pin 500 and from contacting the inner surface of the power pin 500 defining the central bore 550.

Figure 8B:
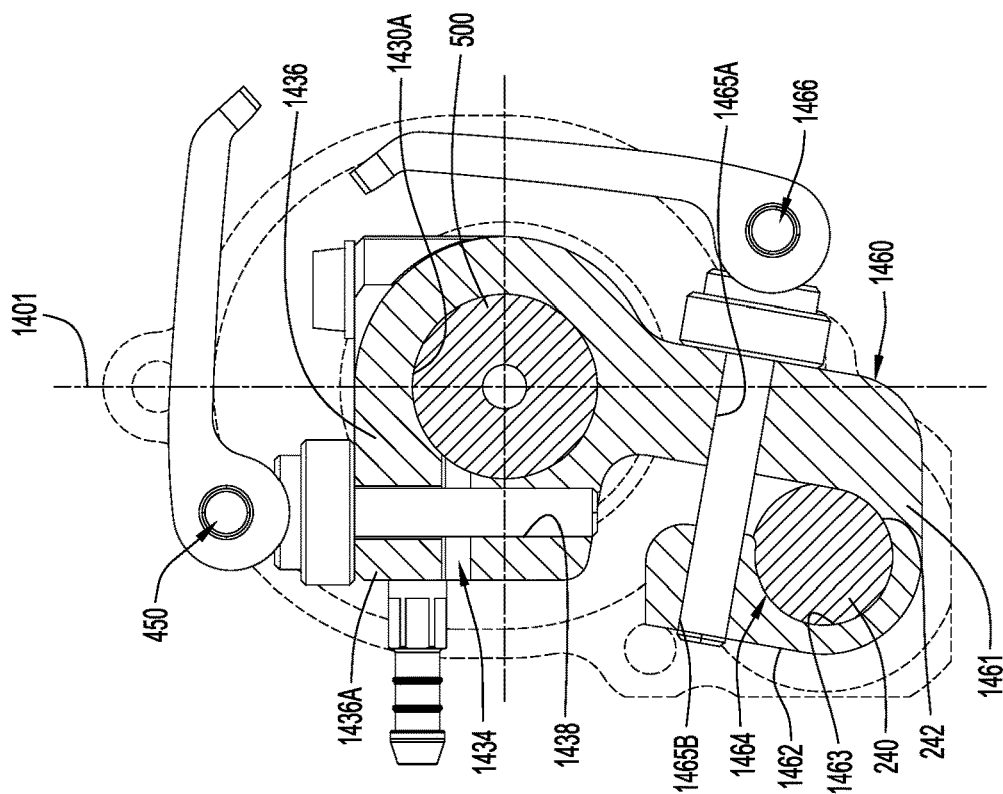
FIG. 8B is a cross-sectional view of the receiving block of FIG. 8A.
Figure 8A:
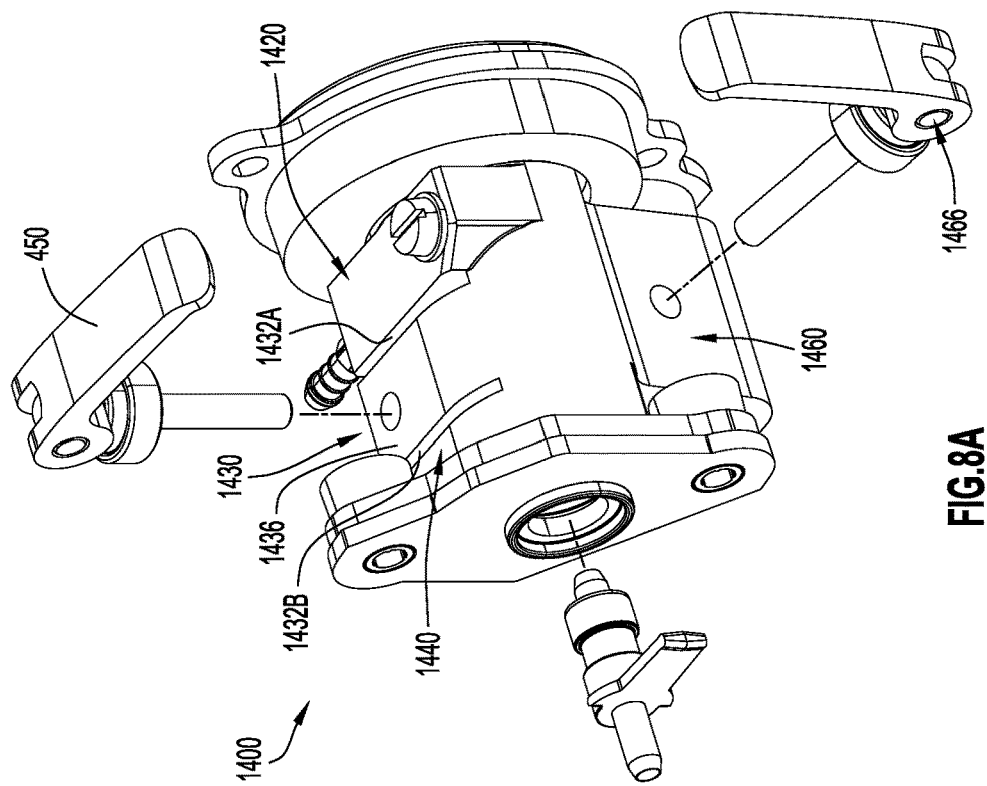
FIG. 8A is a front perspective view of a receiving block according to a second embodiment.

Now Referring to FIGS. 8A and 8B, a receiving block 1400 according to a second embodiment is shown. The receiving block 1400 is similar to receiving block 400, except the clamping bolt 466 for clamping the conductor 240 is replaced with a quick release bolt 1466 similar to quick release bolt 450. The configuration of receiving block's clamping portion and U-shaped conductor connector are adjusted to accommodate the quick release bolt 1466. For brevity, only the differences between receiving block 400 and receiving block 1400 are discussed.

As shown in FIG. 8A, the receiving block 1400 includes a receiver portion 1420, a clamping portion 1430, a distal portion 1440, and a U-shaped conductor coupler 1460. As shown in FIG. 8B, the U-shaped conductor coupler 1460 includes a main body section 1461 that extends from a bottom of the receiving block 1400 downwardly at an angle with respect to a vertical axis 1401. A clamping portion 1462 extends upwards from the main body section 1461 to define a longitudinally extending receiving bore 1464.

A first through hole 1465A extends laterally through the main body section 1461, and a second through hole 1465B, coaxial with the firsts through hole 1465A, extends laterally through the clamping section 1462. The first and second through holes 465A, 465B receive a quick release bolt 1466. To accommodate the quick release bolt 1466, the first and second through holes 465A, 465B extend at an oblique angle with respect to the vertical axis 1401. When clamped, the quick release bolt 1466 applies a force to pull the clamping section 1462 towards the main body section 1461 until an inner surface 1463 of the coupler 1460 contacts and bears against an outer surface 242 of the conductor 240 thereby securing the conductor 240 within the receiving bore 1464. Accordingly, the conductor 240 is secured and electrically coupled to the U-shaped conductor coupler 1460, and thus, the receiving block 1400.

In the depicted embodiment, the clamping portion 1430 includes an inner surface 1430A for engaging the power pin 500. The clamping portion 1430 includes a first radial gap 1432A, a second radial gap 1432B parallel to the first radial gap 1432A. The first and second radial gaps 1432A, 1432B extend perpendicularly with respect to the vertical axis 1401. A third radial gap 1434 extends from the first radial gap 1432A to the second radial gap 1432B. The first, second and third radial gaps 1432A, 1432B, and 1434 extend radially from the inner surface 1430A to one or more outer surfaces of the receiving block 1400. Additionally, the first, second, and third radial gaps 1432A, 1432B, and 1434 define a resilient finger 1436 having a lateral portion 1436A that receives a quick release bolt 450. The resilient finger 1436 extends in a direction substantially perpendicular to the vertical axis 1401.

As shown in FIG. 8B, the quick release bolt 450 is disposed in a vertically extending bore 1438 that extends from an outer surface of the lateral portion 1436A of the finger 1436 and into the clamping portion 1430 of the receiving block 1400. The upper portion 1436A can translate through the third radial gap 1434 in response to a force received from the quick release bolt 450. That is, a length of the third radial gap 1434 can be varied in response to loosening or tightening of the quick release bolt 450. For example, tightening the quick release bolt 450 decreases the length of the third radial gap 1434. Conversely, loosening the quick release bolt 450 increases the length of the third radial gap 1434. Consequently, the length of the third radial gap 1434 is variable based on the force applied by the quick release bolt 450. Thus, the quick release bolt 450 can be tightened and loosened to place the clamping portion 1430 between a clamped position (e.g., similar to configuration to C3 shown in FIG. 3D) and a released position (e.g., similar to configuration C2 shown in FIG. 3C).

Accordingly, a connector 30 is presented in which the liner cap 610 and liner 600 can be easily installed, secured, and/or replaced without the drawbacks of the conventional liner and bolt arrangement noted above. Additionally, with one hand, a user can insert the power pin 500 into a receiving block 400, 1400 and provisionally lock the plug 50 with the engagement mechanism 700, let go of the torch cable 114, and clamp and secure the power pin 500 in place with the quick release bolt 450. Consequently, electricity and fluid may be efficiently transmitted from the receiving block 400, 1400 to the power pin 500 without the drawbacks of the conventional power pin noted above.

While the invention has been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the welding system 1 described herein, or portions thereof may be fabricated from any suitable material or combination of materials, such as plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), lowdensity polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Further, the terms "upstream" and "downstream" are considered in relation to a path of the weld wire (e.g., from the wire guide 900 to the cable conductor 115 in FIG. 7). Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

What is claimed is:

1. A multi-diameter power pin for an arc process system comprising:
    a proximal portion having a first diameter;
    an engagement portion extending from the proximal portion, the engagement portion having a second diameter smaller than the first diameter and an annular groove extending into an outer surface of the engagement portion, wherein a fluid channel extends radially from the annular groove to a central bore extending through the power pin;
    a bearing portion extending from the engagement portion, the bearing portion having a third diameter smaller than the second diameter; and
    a distal portion extending from the bearing portion, the distal portion having a fourth diameter smaller than the third diameter.

2. The power pin of claim 1, wherein the engagement portion comprises an engagement mechanism configured to restrict axial movement of the power pin when the power pin is received in a receiving block.

3. The power pin of claim 2, wherein the engagement portion further comprises a radially extending bore and the engagement mechanism comprises a radially translatable ball bearing and spring disposed in the radially extending bore.

4. The power pin of claim 1, wherein the engagement portion further comprises:
    a first annular seal disposed upstream of the annular groove; and
    a second annular seal disposed downstream of the annular groove.

5. The power pin of claim 1, wherein the distal portion comprises a threaded outer surface.

6. The power pin of claim 1, further comprising:
    a central bore extending along a longitudinal axis of the power pin; and
    a liner extending through the central bore, the liner comprising a liner cap configured to engage the distal portion.

7. A socket of an arc process system comprising:
    a receiving block having a multi-diameter through hole, the receiving block comprising:
        a plurality of gaps extending radially from the multi-diameter through hole to an outer surface of the receiving block;
        a receiving portion disposed between a lateral surface of the receiving block and a first gap of the plurality of gaps; and
        a clamping portion disposed between the plurality of gaps.

8. The socket of claim 7, wherein the multi-diameter through hole has a first diameter at the receiving portion and a second diameter at the clamping portion, the second diameter being smaller than the first diameter.

9. The socket of claim 7, wherein an inner surface of the receiving portion comprises a first annular groove configured to receive an engagement mechanism when a power pin is inserted into the through hole.

10. The socket of claim 9, wherein the inner surface further comprises a second annular groove; and when the power pin is disposed in the through hole, the second annular groove cooperates with a third annular groove disposed in the power pin to form a fluid channel.

11. The socket of claim 7, wherein the clamping portion comprises a quick release bolt.

12. The socket of claim 11, wherein the clamping portion is translatable by tightening the quick release bolt.

13. The socket of claim 7, wherein when a power pin is inserted into the through hole, the clamping portion is configured to bear against a bearing portion of the power pin and prevent the power pin from moving.

14. The socket of claim 13, wherein the receiving block is electrically coupled to the power pin when the clamping portion bears against the bearing portion.

15. An electrical connection system comprising:
    a multi-diameter power pin comprising:
        a proximal portion having a first diameter;
        an engagement portion extending from the proximal portion, the engagement portion having a second diameter smaller than the first diameter;
        a bearing portion extending from the engagement portion, the bearing portion having a third diameter smaller than the second diameter; and
        a distal portion extending from the bearing portion, the distal portion having a fourth diameter smaller than the third diameter; and
    a receiving block having a multi-diameter through hole configured to receive the multi-diameter power pin, the receiving block comprising:
        a plurality of gaps extending radially from the multi-diameter through hole to an outer surface of the receiving block;

a receiving portion disposed between a lateral surface of the receiving block and a first gap of the plurality of gaps; and a clamping portion disposed between the plurality of gaps.

16. The electrical connection system of claim 15, wherein an inner surface of the receiving portion comprises a first annular groove configured to receive an engagement mechanism disposed at the engagement portion when the power pin is inserted into the through hole.

17. The electrical connection system of claim 16, wherein the inner surface further comprises a second annular groove; and when the power pin is disposed in the through hole, the second annular groove cooperates with a third annular groove disposed in the engagement portion to form a fluid channel.

18. The electrical connection system of claim 17, further comprising annular seals disposed between the engagement portion and the receiving portion.

19. A multi-diameter power pin for an arc process system comprising:

a proximal portion having a first diameter;

an engagement portion extending from the proximal portion, the engagement portion having a second diameter smaller than the first diameter;

a bearing portion extending from the engagement portion, the bearing portion having a third diameter smaller than the second diameter;

a distal portion extending from the bearing portion, the distal portion having a fourth diameter smaller than the third diameter;

a central bore extending along a longitudinal axis of the power pin; and a liner extending through the central bore, the liner comprising a liner cap configured to engage the distal portion.

20. The power pin of claim 19, wherein the distal portion comprises a threaded outer surface.

21. The power pin of claim 19, wherein the engagement portion comprises an engagement mechanism configured to restrict axial movement of the power pin when the power pin is received in a receiving block.

* * * * *